(12) United States Patent
Kishi

(10) Patent No.: US 10,814,880 B2
(45) Date of Patent: Oct. 27, 2020

(54) DRIVING CONSCIOUSNESS ESTIMATION DEVICE

(71) Applicant: TOYOTA JIDOSHA KABUSHIKI KAISHA, Toyota-shi, Aichi-ken (JP)

(72) Inventor: Hiroshi Kishi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 239 days.

(21) Appl. No.: 16/002,021

(22) Filed: Jun. 7, 2018

(65) Prior Publication Data

US 2018/0354523 A1 Dec. 13, 2018

(30) Foreign Application Priority Data

Jun. 8, 2017 (JP) .................................. 2017-113502

(51) Int. Cl.
*G06K 9/00* (2006.01)
*B60W 40/08* (2012.01)
*G05D 1/02* (2020.01)

(52) U.S. Cl.
CPC ......... *B60W 40/08* (2013.01); *G06K 9/00604* (2013.01); *G06K 9/00791* (2013.01); *G06K 9/00798* (2013.01); *G06K 9/00845* (2013.01); *B60W 2040/0818* (2013.01); *B60W 2040/0872* (2013.01); *B60W 2540/22* (2013.01); *G05D 1/021* (2013.01)

(58) Field of Classification Search
CPC . B60W 2040/0818; B60W 2040/0872; B60W 2540/22; B60W 40/08; B60W 50/14; G05D 1/021; G06K 9/00604; G06K 9/00791; G06K 9/00798; G06K 9/00845
See application file for complete search history.

(56) References Cited

U.S. PATENT DOCUMENTS

2015/0375757 A1  12/2015 Schiek et al.
2017/0313319 A1  11/2017 Kishi et al.

FOREIGN PATENT DOCUMENTS

JP    2003099899 A    4/2003
JP    2008084219 A    4/2008

(Continued)

OTHER PUBLICATIONS

Fletcher, Luke, and Alexander Zelinsky. "Driver inattention detection based on eye gaze-Road event correlation." The international journal of robotics research 28.6 (2009): 774-801. (Year: 2009).*

*Primary Examiner* — Nirav G Patel
(74) *Attorney, Agent, or Firm* — Sughrue Mion, PLLC

(57) ABSTRACT

A driving consciousness estimation device is configured to estimate a driver's driving consciousness of a host vehicle as a driving readiness degree. The device includes a viewing target recognition unit configured to recognize a viewing target used for estimating the driving readiness degree based on a result of detection by an external sensor of the host vehicle, a driver's line of sight recognition unit configured to recognize a driver's line of sight, a viewing reaction index calculation unit configured to calculate a driver's viewing reaction index for the viewing target based on the driver's line of sight recognized by the driver's line of sight recognition unit, and a driving readiness degree estimation unit configured to estimate the driving readiness degree based on the viewing reaction index.

6 Claims, 14 Drawing Sheets

(56) References Cited

FOREIGN PATENT DOCUMENTS

| JP | 2010039933 A | 2/2010 |
| JP | 2015138308 A | 7/2015 |
| JP | 2016-015137 A | 1/2016 |
| JP | 2017-199279 A | 11/2017 |

* cited by examiner

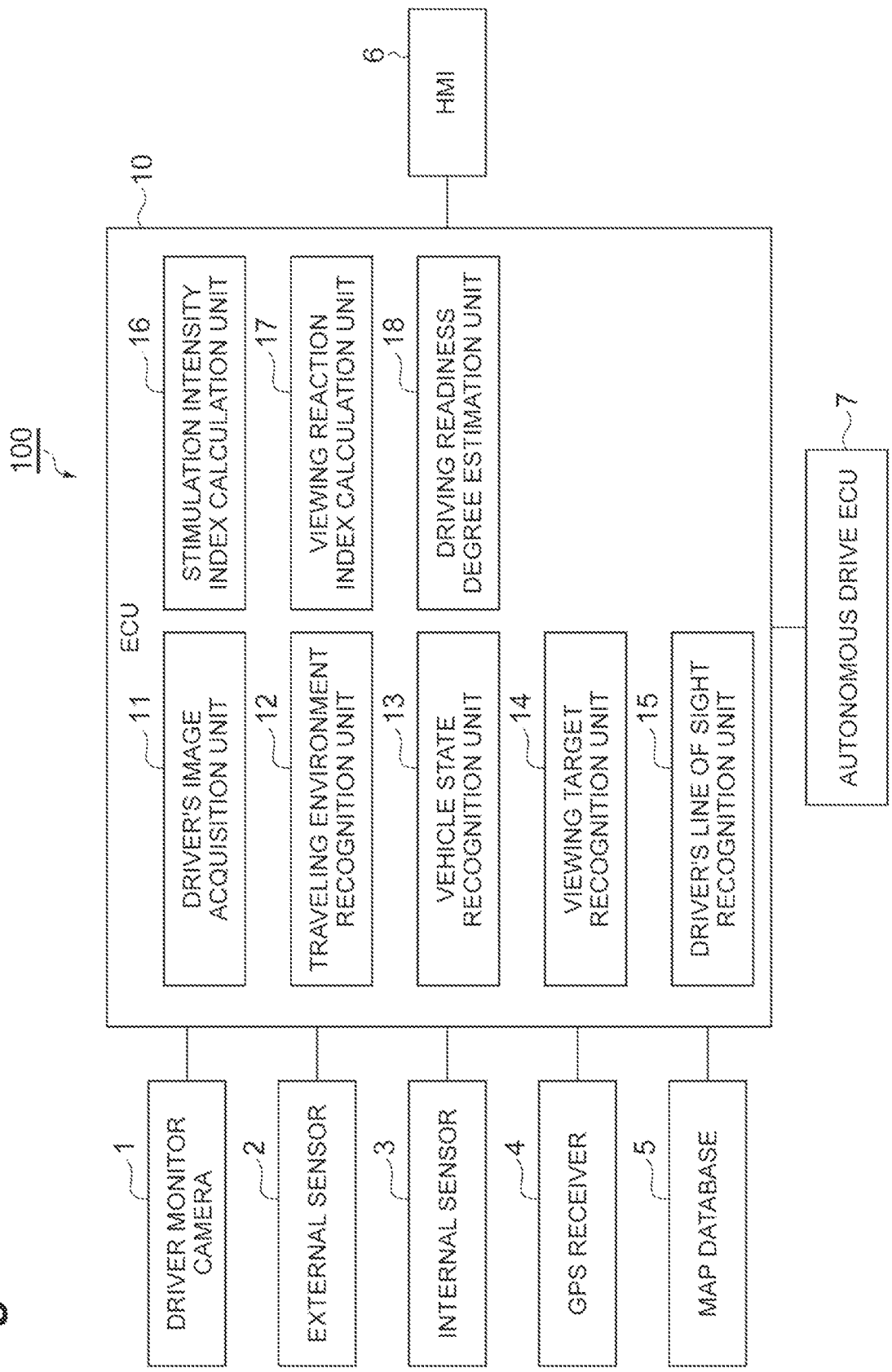

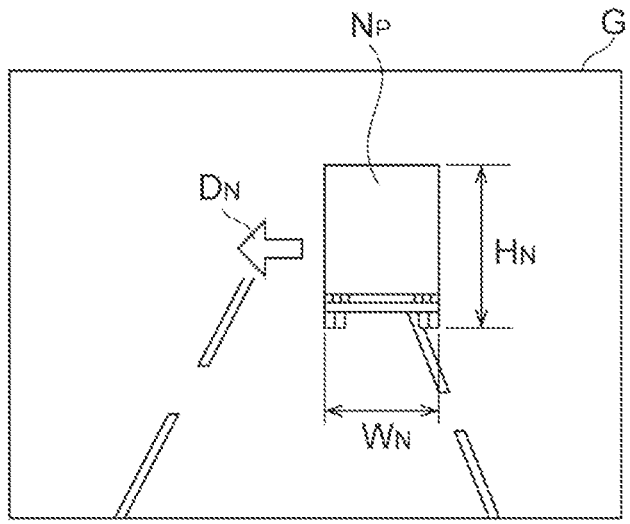
Fig.2A
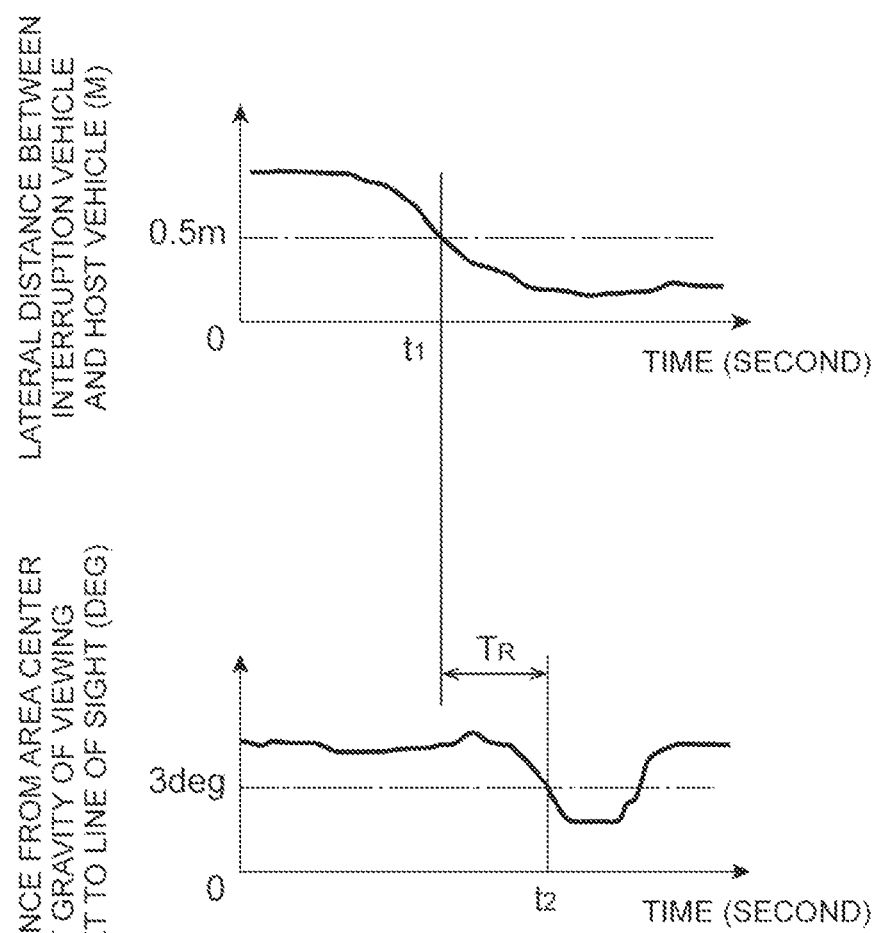
Fig.2B
Fig.2C

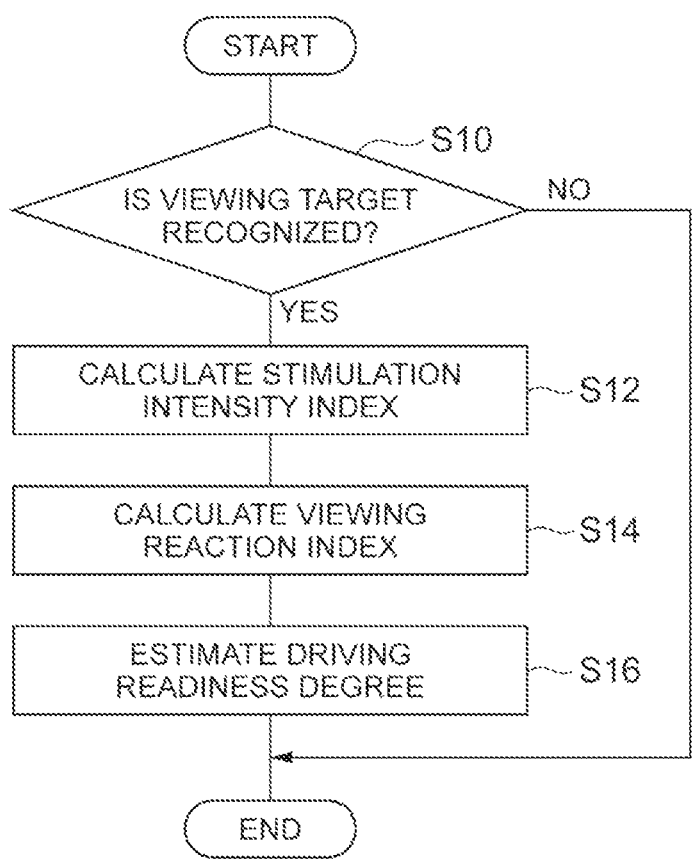

DRIVING CONSCIOUSNESS ESTIMATION DEVICE

BACKGROUND OF THE INVENTION

Field of the Invention

The present disclosure relates to a driving consciousness estimation device.

Related Background Art

In the related art, Japanese Unexamined Patent Publication No. 2016-15137 is known as a technical literature relating to a system considering a situation of a driver. In the literature, an autonomous traveling system for a vehicle is disclosed, which calculates a lead time that is a remaining time for an autonomous traveling to be reliably continued and a reaction time for the driver to intervene in the autonomous driving (corresponding to a manual driving).

In this system, when a comfort time which is a difference between the lead time and the reaction time becomes zero, a countermeasure to the driver such as a warning is performed.

SUMMARY

However, in the system in the related art described above, a driver's driving consciousness is not appropriately considered. Therefore, in the system in the related art, even when the driver's driving consciousness is high, if the comfort time becomes zero, a countermeasure such as a warning is performed, and thus, there is a problem in that the driver may feel uncomfortable. In order to perform a vehicle control such as the warning in consideration of the driver's driving consciousness as described above, it is necessary to estimate the driver's driving consciousness with sufficient accuracy. In this regard, there is room for improvement for an appropriate estimation of the driving consciousness.

Therefore, in this technical field, it is desirable to provide a driving consciousness estimation device that can appropriately estimate the driver's driving consciousness.

In order to solve the problems described above, a driving consciousness estimation device in an aspect of the present disclosure is configured to estimate a driver's driving consciousness of a host vehicle as a driving readiness degree. The device includes a viewing target recognition unit configured to recognize a viewing target used for estimating the driving readiness degree based on a result of detection by an external sensor of the host vehicle, a driver's line of sight recognition unit configured to recognize a driver's line of sight, a viewing reaction index calculation unit configured to calculate a driver's viewing reaction index for the viewing target based on the driver's line of sight recognized by the driver's line of sight recognition unit, and a driving readiness degree estimation unit configured to estimate the driving readiness degree based on the viewing reaction index.

According to the driving consciousness estimation device in the aspect of the present disclosure, since it can be considered that the viewing reaction to the viewing target such as an interruption vehicle in front of the host vehicle of a driver having a high driving consciousness is faster than that of a driver having a low driving consciousness, it is possible to appropriately estimate the driving readiness degree relating to the driver's driving consciousness based on the viewing reaction index.

In the driving consciousness estimation device in the aspect described above, the device may further include a stimulation intensity index calculation unit configured to calculate a stimulation intensity index of the viewing target. If the viewing target recognition unit recognizes another vehicle as the viewing target, the stimulation intensity index calculation unit may calculate the stimulation intensity index of the other vehicle based on at least one of a relative situation between the host vehicle and the other vehicle and a viewing area of the other vehicle, and the driving readiness degree estimation unit may estimate the driving readiness degree based on the stimulation intensity index and the viewing reaction index.

According to the driving consciousness estimation device, since it can be considered that the reaction of the driver is different depending on the stimulus given to the driver, it is possible to appropriately estimate the driving readiness degree while considering the stimulation intensity index of the other vehicle calculated from the relative situation between the other vehicle which is the viewing target and host vehicle and/or the viewing area of the other vehicle.

In the driving consciousness estimation device in the aspect described above, the device may further include a stimulation intensity index calculation unit configured to calculate a stimulation intensity index of the viewing target. If the viewing target recognition unit recognizes a road shape as the viewing target, the stimulation intensity index calculation unit may calculate the stimulation intensity index of the road shape based on at least one of a curvature radius of the road shape and the number of traveling vehicles in the road shape, and the driving readiness degree estimation unit may estimate the driving readiness degree based on the stimulation intensity index and the viewing reaction index.

According to the driving consciousness estimation device, since it can be considered that the driver's reaction changes depending on the stimulus given to the driver as the viewing target, it is possible to appropriately estimate the driving readiness degree while considering the stimulation intensity index of the viewing target calculated from the curvature radius and/or the number of traveling vehicles (the acceleration and the rotation angular acceleration in the lateral direction and the longitudinal direction of the vehicle may be further taken into consideration) in the road shape such as a curve or a merging section.

In the driving consciousness estimation device in the aspect described above, the device may further include a stimulation intensity index calculation unit configured to calculate a stimulation intensity index of the viewing target. If the viewing target recognition unit recognizes an object on a road as the viewing target, the stimulation intensity index calculation unit is configured to calculate the stimulation intensity index of the object based on the viewing area of the object, and the driving readiness degree estimation unit may estimate the driving readiness degree based on the stimulation intensity index and the viewing reaction index.

According to the driving consciousness estimation device, since it can be considered that the driver's reaction changes depending on the stimulus given to the driver as the viewing target, it is possible to appropriately estimate the driving readiness degree while considering the viewing area of the object on the road.

In the driving consciousness estimation device in the aspect described above, the device may further include an eye-blink state recognition unit configured to recognize a driver's eye-blink state. The driving readiness degree estimation unit may correct the driving readiness degree based on the driver's eye-blink state.

According to the driving consciousness estimation device, since the driver's eye-blink state changes according to the driving consciousness, the driving readiness degree is corrected based on the eye-blink state. Therefore, it is possible to avoid a problem in that the driving readiness degree is erroneously estimated to be high when the driver views the direction of the viewing target by accident while maintaining a low driving consciousness. Therefore, it is possible to appropriately estimate the driving readiness degree.

In the driving consciousness estimation device in the aspect described above, the device may further include a movement range recognition unit configured to recognize a movement range of the driver's line of sight based on the driver's line of sight recognized by the driver's line of sight recognition unit, and the driving readiness degree estimation unit may correct the driving readiness degree based on the movement range.

According to the driving consciousness estimation device, since the movement range of the driver's line of sight changes according to the driving consciousness, the driving readiness degree is corrected based on the movement range. Therefore, it is possible to avoid a problem in that the driving readiness degree is erroneously estimated to be high when the driver views the direction of the viewing target by accident while maintaining the low driving consciousness. Therefore, it is possible to appropriately estimate the driving readiness degree.

In the driving consciousness estimation device in the aspect described above, the device may further include an optical flow recognition unit configured to recognize an optical flow of a landscape in front of the host vehicle based on an image captured by the camera of the host vehicle. The driving readiness degree estimation unit may correct the driving readiness degree based on the optical flow recognized by the optical flow recognition unit and the driver's line of sight recognized by the driver's line of sight recognition unit.

According to the driving consciousness estimation device, since the line of sight of the driver having a low driving consciousness tends to be dragged into the direction of the optical flow which is the flowing direction of the landscape, the driving readiness degree is corrected based on the optical flow and the driver's line of sight. Therefore, it is possible to appropriately estimate the driving readiness degree.

In the driving consciousness estimation device in the aspect described above, the driving readiness degree estimation unit may perform estimations of the driving readiness degrees multiple times for each viewing target, perform weighting of the driving readiness degrees according to the viewing target, and calculate the integrated driving readiness degree based on the driving readiness degrees estimated multiple times within a time set in advance and the result of weighting. According to the driving consciousness estimation device, the device calculates the integrated driving readiness degree from the driving readiness degrees estimated multiple times for each viewing target and the weighted driving readiness degree according to the viewing target, and thus, it is possible to avoid a problem in that the driver's driving consciousness is estimated to be excessively low due to a temporary overlooking. Therefore, it becomes possible to output the integrated driving readiness degree relating to overall driver's driving consciousness within a time set in advance.

As described above, according to various aspects of the present disclosure, it is possible to appropriately estimate the driver's driving consciousness.

BRIEF DESCRIPTION OF THE DRAWINGS

FIG. 1 is a block diagram illustrating a driving consciousness estimation device in a first embodiment.

FIG. 2A is a diagram for explaining a calculation of a stimulation intensity index of an interruption vehicle.

FIG. 2B is a graph illustrating a temporal change of a lateral distance between the interruption vehicle and a host vehicle.

FIG. 2C is a graph illustrating a temporal change of a distance from an area center of gravity of a viewing target to a line of sight.

FIG. 6 is a flowchart illustrating driving readiness degree estimation processing by the driving consciousness estimation device in the first embodiment.

DESCRIPTION OF THE PREFERRED EMBODIMENTS

Figure 3:
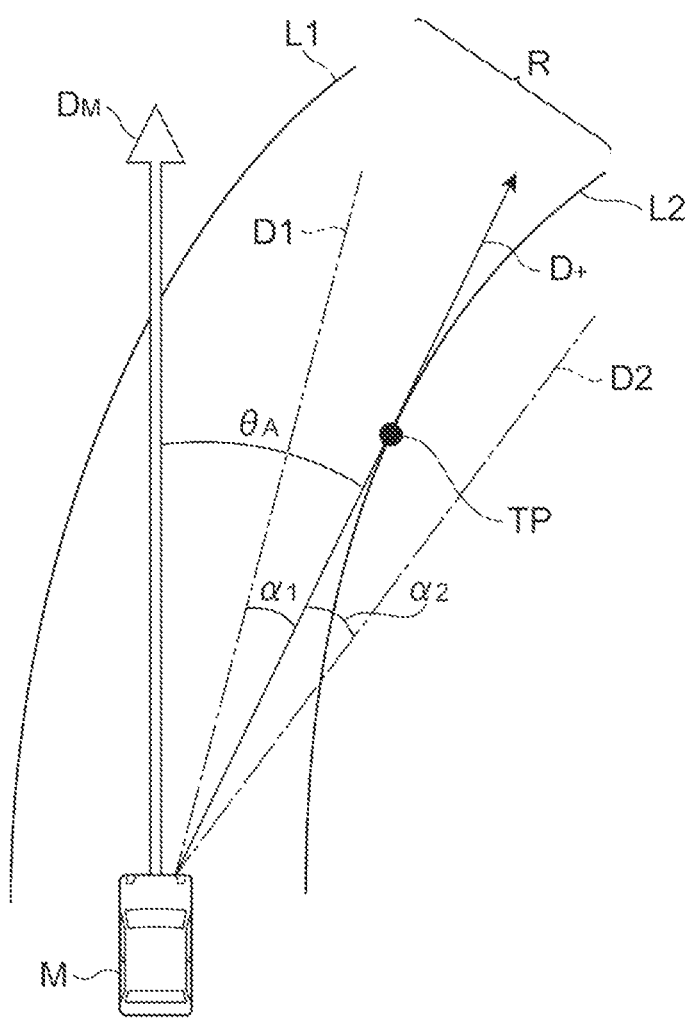
FIG. 3 is a diagram for explaining a calculation of a viewing reaction index when the viewing target is a curve.

Hereinafter, embodiments of the present disclosure will be described with reference to the drawings.

First Embodiment

A driving consciousness estimation device 100 in a first embodiment illustrated in FIG. 1 is a device that performs an estimation of a driving readiness degree relating to a driving consciousness of a driver. The driving consciousness estimation device 100 performs the estimation of the driving readiness degree using a viewing target that the driver is actively trying to see with high driving consciousness. The viewing target and the driving readiness degree will be described later. The driving consciousness estimation device 100 may form a part of an autonomous (automatic) driving system that performs autonomous driving of the host vehicle.

Configuration of Driving Consciousness Estimation Device in First Embodiment Hereinafter, the configuration of the driving consciousness estimation device 100 in the present embodiment will be described. As illustrated in FIG. 1, the driving consciousness estimation device 100 includes an electronic control unit (ECU) 10 that generally manages the device.

The ECU 10 is an electronic control unit including a central processing unit (CPU), read only memory (ROM), random access memory (RAM) and the like. In the ECU 10, various functions are realized by a program stored in the ROM being loaded on the RAM and the CPU executing the program loaded on the RAM. The ECU 10 may be configured to include a plurality of electronic control units.

A driver monitor camera 1, an external sensor 2, an internal sensor 3, a global positioning system (GPS) receiver 4, a map database 5, and an HMI 6 are connected to the ECU 10.
In addition, the ECU 10 is connected to an autonomous drive ECU 7.

The driver monitor camera 1 is provided on a cover of a steering column of the host vehicle and in front of the driver, and images a head of the driver. Since the driver monitor camera 1 images the driver from plural directions, plural number of cameras may be provided. The driver monitor camera 1 transmits a driver's image in which the driver is imaged to the ECU 10.

The external sensor 2 is a detection device that detects a surrounding environment of the host vehicle. The external sensor 2 includes a camera and a radar sensor.

The camera is provided, for example, on the inner side of windshield of the host vehicle and images the front of the host vehicle. The camera may be provided on the rear surface or the side surface of the host vehicle. The camera transmits image information relating to surroundings of the host vehicle to the ECU 10. The camera may be a monocular camera or may be a stereo camera. The stereo camera has two imaging units that are arranged so as to reproduce a binocular parallax.

The radar sensor is a detection device that detects obstacles around the vehicle using radio waves (for example, millimeter waves) or light. The radar sensor includes, for example, millimeter wave radar or a light detection and ranging (LIDAR). The radar sensor transmits the radio wave or light to the surroundings of the host vehicle, and detects the obstacles by receiving radio waves or light reflected from obstacles. The radar sensor transmits the detected obstacle information to the ECU 10. Obstacles include fixed objects such as guardrails and buildings, and pedestrians, bicycles, other vehicles, and the like.

The internal sensor 3 is a detection device that detects a vehicle state of the host vehicle. The internal sensor 3 includes a vehicle speed sensor, accelerator sensor, and a yaw rate sensor. The vehicle speed sensor is a detection device that detects a speed of the host vehicle. As the vehicle speed sensor, for example, a vehicle wheel speed sensor is used, which is provided on vehicle wheels of the host vehicle or on a drive shaft rotating integrally with vehicle wheels, and detects a rotational speed of the vehicle wheels.
The vehicle speed sensor transmits the detected vehicle speed information (vehicle wheel speed information) to the ECU 10.

The accelerator sensor is a detection device that detects an acceleration of the host vehicle. The accelerator sensor includes, for example, a longitudinal accelerator sensor that detects acceleration in the longitudinal direction of the host vehicle and a lateral accelerator sensor that detects a lateral acceleration of the host vehicle. The accelerator sensor transmits, for example, acceleration information of the host vehicle to the ECU 10. The yaw rate sensor is a detection device that detects a yaw rate (rotation angular velocity) around the vertical axis at the center of gravity of the host vehicle. As the yaw rate sensor, for example, a Gyro sensor can be used. The yaw rate sensor transmits the detected yaw rate information of the host vehicle to the ECU 10.

The GPS receiver 4 measures the position of the host vehicle (for example, the latitude and longitude of the host vehicle) by receiving a signal from three or more GPS satellites. The GPS receiver 4 transmits the measured position information on the host vehicle to the ECU 10. The driving consciousness estimation device 100 may acquire the position information on the host vehicle using a simultaneous localization and mapping (SLAM) technology which uses the result of detection by the external sensor 2 and map information, instead of the GPS.

The map database 5 is a database storing the map information. The map database 5 is formed, for example, in a hard disk drive (HDD) mounted on the host vehicle. The map information includes information on the position of the road, information on the shape of the road (for example, types of curves or straight roads, a curvature of the curve, or the like), information on the width of the road, information on the height of the road, information on the location of the intersection, merging point, and the branch, and information on the position of a building. The map information may include position information relating to an object on the road such as a guide plate, a sign, or the like. The map database 5 may be stored in a computer in a facility such as a management center that can communicate with the host vehicle.

The HMI 6 is an interface that performs inputting and outputting of the information between the driving consciousness estimation device 100 and the driver. The HMI 6 includes, for example, a display and a speaker of the host vehicle. The HMI 6 outputs an image on the display and outputs a voice from the speaker according to a control signal from the ECU 10. The HMI 6 may include a head up display (HUD).

The autonomous drive ECU 7 is an electronic control unit that is mounted on the host vehicle and executes an autonomous driving of the host vehicle. The autonomous driving means a vehicle control causing the host vehicle to travel autonomously without the driving operation by the driver. In the Society of Automotive Engineers (SAE) J3016, autonomous driving level 0 to autonomous driving level 4 are defined according to the degree of the autonomous driving.

The autonomous drive ECU 7 generates a travel plan along a preset target route based on the position information of the host vehicle from the GPS receiver 4, the map information in the map database 5, and a traveling environment and the vehicle state of the host vehicle described below. The target route is set by the driver of the host vehicle or a known navigation system. The autonomous drive ECU 7 executes the autonomous driving according to the travel plan. The autonomous drive ECU 7 executes the autonomous driving by transmitting the control signal to an actuator (an engine actuator, a steering actuator, a brake actuator, or the like) of the host vehicle. The autonomous drive ECU 7 generates the travel plan using a known method and executes the autonomous driving.

Next, a functional configuration of the ECU 10 will be described. A part of the functions of the ECU 10 described below may be an aspect of being executed by the computer in the facility such as the management center that can communicate with the host vehicle and/or by the autonomous drive ECU 7. In addition, the ECU 10 may be integrated with the autonomous drive ECU 7.

The ECU 10 includes a driver's image acquisition unit 11, a traveling environment recognition unit 12, a vehicle state recognition unit 13, a viewing target recognition unit 14, a driver's line of sight recognition unit 15, a stimulation intensity index calculation unit 16, a viewing reaction index calculation unit 17, and a driving readiness degree estimation unit 18.

The driver's image acquisition unit 11 acquires a driver's image from the driver monitor camera 1. If the driver monitor camera 1 includes plural cameras, the driver's image acquisition unit 11 acquires the driver's images from each camera in association with each other.

The traveling environment recognition unit 12 recognizes the traveling environment around the host vehicle. The traveling environment recognition unit 12 recognizes the traveling environment based on the result of detection by the external sensor 2, the position information from the GPS receiver 4, the map information in the map database 5 and the information relating to the autonomous driving from the autonomous drive ECU 7. The traveling environment recognition unit 12 recognizes the traveling environment around the host vehicle using a known method. A situation of obstacles around the vehicle and a road situation are included in the traveling environment. The traveling environment recognition unit 12 does not necessarily need to use the information of the autonomous drive ECU 7 and may only use the detection result of the external sensor 2.

The traveling environment recognition unit 12 recognizes the situation of the obstacles around the host vehicle based on the result of detection by the external sensor 2. Positions of the obstacle with respect to the host vehicle, a relative speed of the obstacle with respect to the host vehicle, a moving direction of the obstacle with respect to the host vehicle, and the like are included in the situations of the obstacles around the host vehicle. The traveling environment recognition unit 12 may recognize lane lines based on captured images in front of the host vehicle by the camera of external sensor 2 using a well-known method. The traveling environment recognition unit 12 can recognize the interruption vehicle which interrupts in front of the host vehicle, a braking preceding vehicle, an overtaking vehicle that overtakes the host vehicle from the side, or the like using a well-known method.

In addition, the traveling environment recognition unit 12 recognizes road shapes (curves, intersections, merging sections, and the like.) in front of the host vehicle as road conditions based on the result of detection by the external sensor 2. The traveling environment recognition unit 12 may recognize the number of vehicles traveling on each road shape using a well-known method.

Specifically, the traveling environment recognition unit 12 may recognize the number of other vehicles traveling in the lane merging into the lane of the host vehicle in the merging section. The traveling environment recognition unit 12 may recognize objects (such as a guide plate, a sign, a road marking, a traffic signal or the like) on the road using a well-known method based on the result of detection by the external sensor 2. The traveling environment recognition unit 12 may recognize the road shape in front of the host vehicle from the position information and the map information on the host vehicle or may recognize the object on the road from the position information and map information on the host vehicle.

The vehicle state recognition unit 13 recognizes a state of the host vehicle during traveling based on the result of detection by the internal sensor 3. The vehicle state includes the vehicle speed of the host vehicle, the acceleration of the host vehicle, and the yaw rate of the host vehicle. Specifically, the vehicle state recognition unit 13 recognizes the vehicle speed of the host vehicle based on the vehicle speed information from the vehicle speed sensor. The vehicle state recognition unit 13 recognizes the acceleration of the host vehicle (the longitudinal acceleration and the lateral acceleration) based on the acceleration information from the accelerator sensor. The vehicle state recognition unit 13 recognizes the yaw rate of the host vehicle based on the yaw rate information from the yaw rate sensor. The ECU 10 does not necessarily need to include a vehicle state recognition unit 13.

The viewing target recognition unit 14 recognizes the viewing target used for estimating the driver's driving readiness degree based on the traveling environment recognized by the traveling environment recognition unit 12. At least one of a viewing target vehicle, the road shape, and the object on the road is included in the viewing target.

The viewing target vehicles are other vehicles used for estimating the driver's driving readiness degree. At least one of an interruption vehicle that interrupts in front of the host vehicle, a braking preceding vehicle (a brake lamp is lit), a preceding vehicle causing the host vehicle in autonomous driving to change the speed, and an overtaking vehicle that overtakes the host vehicle from the side, is included in the viewing target vehicle.

The preceding vehicle causing the host vehicle in autonomous driving to change the speed includes a preceding vehicle causing the host vehicle to decelerate because a distance between the host vehicle and the preceding vehicle is decreased due to the deceleration of the preceding vehicle in autonomous driving, and a preceding vehicle causing the host vehicle to accelerate using the autonomous driving due to a rapid acceleration of the preceding vehicle when the host vehicle in autonomous driving is following the preceding vehicle. The preceding vehicle in this case may be limited to the preceding vehicle which caused the host vehicle to decelerate or accelerate by equal to or higher than a predetermined value.

The viewing target road shape includes at least one of the curve, the intersection, a merging section (including a lane merging with the traveling lane of the host vehicle), and a branching section (including a lane branched from the traveling lane of the host vehicle). The viewing target curve may be limited to a curve whose curvature radius is equal to or shorter than a certain value (for example, 640 m) and the curve length is equal to or longer than a certain length (for example, 60 m). The viewing target object on the road includes at least one of a guide plate, a sign, a road marking, a traffic signal, or the like.

If it is determined that the lateral distance (the distance in the vehicle width direction of the host vehicle) between the other vehicle traveling in an adjacent lane of the host vehicle and the host vehicle is shorter than a lateral distance threshold value based, for example, on the traveling environment recognized by the traveling environment recognition unit 12, the viewing target recognition unit 14 recognizes the other vehicle as an interruption vehicle of the viewing target vehicle. When the other vehicle enters the traveling lane of the host vehicle across the lane line, the viewing target recognition unit 14 may recognize the other vehicle as the interruption vehicle of the viewing target.

When the lighting of the brake lamp of the preceding vehicle is recognized based on the image captured by the camera of the external sensor 2, the viewing target recognition unit 14 may recognize the braking preceding vehicle as the viewing target vehicle. The viewing target recognition unit 14 may recognize the braking preceding vehicle as the viewing target vehicle by determining the braking (deceleration) of the preceding vehicle.

In addition, the viewing target recognition unit 14 may recognize the preceding vehicle that caused the host vehicle in autonomous driving to change the speed as the viewing target vehicle by acquiring information on the autonomous driving of the host vehicle from the autonomous drive ECU 7. The viewing target recognition unit 14 may recognize the overtaking vehicle that overtakes the host vehicle from the side as a viewing target vehicle based on the traveling environment recognized by the traveling environment recognition unit 12. The viewing target recognition unit 14 does not need to recognize the overtaking vehicle as the viewing target vehicle when the vehicle speed of the host vehicle is lower than a predetermined threshold value due to congestion or the like. The viewing target recognition unit 14 may recognize the viewing target vehicle using vehicle-to-vehicle communication.

The viewing target recognition unit 14 can recognize the viewing target road shape and the object using a well-known method based on the traveling environment recognized by the traveling environment recognition unit 12. The viewing target recognition unit 14 may recognize the road shape and the object within a certain distance from the host vehicle as the viewing target based on the position information and the map information on the vehicle. The viewing target recognition unit 14 may recognize the viewing target when it is determined that the driver can view the viewing target using well-known image processing or the like based on the image captured by the camera of the external sensor 2.

The driver's line of sight recognition unit 15 recognizes a driver's line of sight based on the driver's image acquired by the driver's image acquisition unit 11. The driver's line of sight recognition unit 15 recognizes the driver's line of sight by detecting driver's eyeballs and a movement of the eyeballs from the driver's image using a well-known method.

The stimulation intensity index calculation unit 16 calculates a stimulation intensity index of the viewing target recognized by the viewing target recognition unit 14. The stimulation intensity index is an index relating to an easiness of attracting the driver's line of sight in the viewing target.

A Case where a Viewing Target is a Viewing Target Vehicle

If another vehicle (viewing target vehicle) is recognized as the viewing target by the viewing target recognition unit 14, the stimulation intensity index calculation unit 16 calculates the stimulation intensity index of the viewing target vehicle based on at least one of a relative situation between the host vehicle and the viewing target vehicle and a viewing area of the viewing target vehicle.

The relative situation between the host vehicle and the viewing target vehicle includes at least one of a vehicle-to-vehicle distance between the host vehicle and the viewing target vehicle, a relative speed between the host vehicle and the viewing target vehicle, a time head-way (THW) between the host vehicle and the viewing target vehicle, a time to collision (TTC) between the host vehicle and the viewing target vehicle. The relative speed between the host vehicle and the viewing target vehicle includes at least one of the relative speed in the longitudinal direction of the host vehicle and a relative speed in the lateral direction (vehicle width direction) of the host vehicle. The relative situation between the host vehicle and the viewing target vehicle also includes a moving speed of the viewing target vehicle viewed from the driver (moving speed of the viewing target vehicle appeared in the driver's field of view).

The viewing area of the viewing target vehicle is an area occupied by the viewing target vehicle in the driver's field of view. An image captured by the camera that captures an image in front of the host vehicle or an image obtained by applying predetermined image processing (viewpoint conversion processing or the like) to the captured image can be regarded as the driver's field of view. In this case, the area occupied by the viewing target vehicle on the image is the viewing area. The viewing area may be recognized as a viewing angle area using the viewing angle (unit: degree).

A case where a Viewing Target Vehicle is an Interruption Vehicle

A case where the viewing target vehicle is an interruption vehicle will be described. The interruption vehicle is another vehicle that interrupts in front of the host vehicle from the adjacent lane adjacent to the traveling lane in which the host vehicle is traveling.

FIG. 2A is a diagram for explaining a calculation of a stimulation intensity index of an interruption vehicle. FIG. 2A illustrates the driver's field of view G viewing in front of the host vehicle. Here, the driver's field of view G is obtained by applying the view point conversion processing to convert the captured image in front of the host vehicle viewed from the camera of external sensor 2 into an image of the view point viewed from the driver of the host vehicle. In FIG. 2A, an interruption vehicle (a truck) Np, a lateral width WN of the interruption vehicle Np in the field of view G, and a vertical width HN of the interruption vehicle Np in the field of view G. The lateral width WN and the vertical width HN can be expressed, for example, as a unit of degree. An arrow DN indicates a moving direction of the interruption vehicle Np in the field of view G.

In a situation illustrated in FIG. 2A, the viewing target recognition unit 14 recognizes the interruption vehicle Np as the viewing target vehicle (the viewing target). For example, if the lateral distance (distance in the vehicle width direction of the host vehicle) between another vehicle traveling in front of the host vehicle in the adjacent lane and the host vehicle becomes equal to or shorter than a lateral direction threshold value, the viewing target recognition unit 14 recognizes another vehicle as the interruption vehicle Np which is a viewing target vehicle. The lateral direction threshold value is a threshold value set in advance for determining whether or not another vehicle is an interruption vehicle (viewing target vehicle).

If the interruption vehicle Np is recognized as the viewing target vehicle, the stimulation intensity index calculation unit 16 calculates the stimulation intensity index of the interruption vehicle Np based on the relative situation between the host vehicle and the interruption vehicle Np and the viewing area of the interruption vehicle Np.

The stimulation intensity index calculation unit 16 recognizes a lateral moving speed of the interruption vehicle Np in the driver's field of view G as the relative situation between the host vehicle and the interruption vehicle Np. The stimulation intensity index calculation unit 16 can recognize the lateral moving speed of the interruption vehicle Np in the driver's field of view G based on the image captured by the camera using well-known image processing. The lateral moving speed of the interruption vehicle Np in driver's field of view G can be expressed in the unit of deg/sec, for example. In addition, the stimulation intensity index calculation unit 16 recognizes the viewing area (lateral width WN×vertical width HN) of the interruption vehicle Np in the driver's field of view G using well-known image processing.

The stimulation intensity index calculation unit 16 may not adopt the current relative speed, but can adopt a maximum value of the lateral relative speed from the current time point up to a certain previous time. Similarly, the stimulation intensity index calculation unit 16 may not adopt the current viewing area, but can adopt a maximum value of the viewing area from the current time point up to a certain previous time. Instead of a certain time, the time may be a time from when the viewing target recognition unit 14 recognizes the interruption vehicle Np up to the time when it is determined that the driver viewed the interruption vehicle Np by the viewing reaction index calculation unit 17 described later.

The stimulation intensity index calculation unit 16 calculates the stimulation intensity index of the interruption vehicle Np based on the lateral relative speed between the host vehicle and the interruption vehicle Np and the viewing area of the interruption vehicle Np. For example, the stimulation intensity index calculation unit 16 calculates a value obtained by multiplying the lateral relative speed between the host vehicle and the interruption vehicle Np by the viewing area of the interruption vehicle Np as the stimulation intensity index of the interruption vehicle Np.

A Case where a Viewing Target Vehicle is an Overtaking Vehicle

If an overtaking vehicle is recognized as the viewing target vehicle, the stimulation intensity index calculation unit 16 calculates the stimulation intensity index of the overtaking vehicle based on the relative situation between the host vehicle and the overtaking vehicle and a size of the overtaking vehicle.

The stimulation intensity index calculation unit 16 recognizes the relative speed between the host vehicle and the overtaking vehicle in the longitudinal direction of the host vehicle as the relative situation between the host vehicle and the overtaking vehicle based on the traveling environment recognized by the traveling environment recognition unit 12. The stimulation intensity index calculation unit 16 recognizes the actual size of the overtaking vehicle based on the traveling environment recognized by the traveling environment recognition unit 12. The actual size of the overtaking vehicle is, for example, the size of the overtaking vehicle (a longitudinal length, height, or the like.) detected by the radar of the host vehicle.

The stimulation intensity index calculation unit 16 calculates the stimulation intensity index of the overtaking vehicle based on the relative speed between the host vehicle and the overtaking vehicle in the longitudinal direction of the host vehicle and the size of the overtaking vehicle. The stimulation intensity index calculation unit 16 can calculate the stimulation intensity index of the overtaking vehicle using arithmetic equations or table data set in advance. For example, the stimulation intensity index calculation unit 16 calculates the stimulation intensity index of the overtaking vehicle as a larger value as the relative speed between the host vehicle and the overtaking vehicle increases. In addition, the stimulation intensity index calculation unit 16 may calculate the stimulation intensity index of the overtaking vehicle as a larger value as the size of the overtaking vehicle increases.

A Case where a Viewing Target Vehicle is a Braking Preceding Vehicle

If the braking preceding vehicle (a preceding vehicle with the brake light on) is recognized as the viewing target vehicle, the stimulation intensity index calculation unit 16 calculates the stimulation intensity index of the preceding vehicle based on the relative situation between the host vehicle and the preceding vehicle and a brightness contrast of the brake lamp of the preceding vehicle. The preceding vehicle is a vehicle that travels immediately in front of the host vehicle in the traveling lane of the host vehicle. The brightness contrast of the brake lamp is a contrast between a brightness of the brake lamp and a brightness of the background in the driver's field of view G. The brightness contrast of the brake lamp can be obtained by well-known image processing.

The stimulation intensity index calculation unit 16 recognizes the vehicle-to-vehicle distance between the host vehicle and the preceding vehicle as the relative situation between the host vehicle and the preceding vehicle based on the traveling environment recognized by the traveling environment recognition unit 12.

The stimulation intensity index calculation unit 16 recognizes the brightness contrast of the brake lamp of the preceding vehicle based on the image captured by the camera of the external sensor 2.

The stimulation intensity index calculation unit 16 calculates the stimulation intensity index of the preceding vehicle based on the vehicle-to-vehicle distance between the host vehicle and the preceding vehicle and the brightness contrast of the brake lamp of the preceding vehicle. The stimulation intensity index calculation unit 16 can calculate the stimulation intensity index of the preceding vehicle using the arithmetic equations or the table data set in advance. For example, the stimulation intensity index calculation unit 16 calculates the stimulation intensity index of the preceding vehicle as a larger value as the brightness contrast of the brake lamp of the preceding vehicle increases. The stimulation intensity index calculation unit 16 may calculate the stimulation intensity index of the preceding vehicle as a larger value as the vehicle-to-vehicle distance between the host vehicle and the preceding vehicle decreases. The stimulation intensity index calculation unit 16 may calculate the stimulation intensity index in consideration of the relative speed between the host vehicle and the preceding vehicle and the relative acceleration between the host vehicle and the preceding vehicle, and the like.

When the Viewing Target Vehicle is a Preceding Vehicle that Causes a Speed Change in the Host Vehicle in Autonomous Driving If the preceding vehicle causing the host vehicle in autonomous driving to change the speed is recognized as the viewing target vehicle, the stimulation intensity index calculation unit 16 calculates the stimulation intensity index of the preceding vehicle based on the viewing area of the preceding vehicle and the acceleration (or deceleration) of the host vehicle.

The stimulation intensity index calculation unit 16 recognizes the viewing area of the preceding vehicle in the driver's field of view G based on the image captured by the camera of the external sensor 2. The stimulation intensity index calculation unit 16 recognizes the acceleration or deceleration of the host vehicle based on the vehicle state recognized by the vehicle state recognition unit 13. The stimulation intensity index calculation unit 16 calculates the stimulation intensity index of the preceding vehicle using the arithmetic equations or the table data set in advance based on the viewing area of the preceding vehicle and the acceleration (or deceleration) of the host vehicle. For example, the stimulation intensity index calculation unit 16 calculates the stimulation intensity index of the preceding vehicle as a larger value as the viewing area of the preceding vehicle increases. The stimulation intensity index calculation unit 16 may calculate the stimulation intensity index of the preceding vehicle as a larger value as the acceleration (or deceleration) of the host vehicle increases.

A Case where a Viewing Target is a Road Shape

When the viewing target recognition unit 14 recognizes the road shape as a viewing target, the stimulation intensity index calculation unit 16 calculates the stimulation intensity index of the road shape based on the curvature of the road shape or the number of vehicles traveling on the road shape.

A Case where a Viewing Target is a Curve

Specifically, if the viewing target is a curve, the stimulation intensity index calculation unit 16 calculates the stimulation intensity index of the curve based on the curvature radius of the curve recognized by the traveling environment recognition unit 12 and the vehicle speed of the host vehicle recognized by the vehicle state recognition unit 13. For example, the stimulation intensity index calculation unit 16 calculates a value obtained by multiplying the curvature radius of the curve by the vehicle speed of the host vehicle as the stimulation intensity index of the curve.

For example, the stimulation intensity index calculation unit 16 may recognize the curvature radius of the curve from a traveling history of the host vehicle (the traveling history in which the position information and the lane line recognition information or the yaw rate information are associated).

A Case where a Viewing Target is a Merging Section

If the viewing target is a merging section, the stimulation intensity index calculation unit 16 calculates the stimulation intensity index of the merging section based on the number of the traveling vehicles in the merging section recognized by the traveling environment recognition unit 12. The merging section can be, for example, a section at a predetermined backward distance from a merging point set in advance on the map. The number of traveling vehicles in the merging section may be the number of traveling vehicles in the lane merging into the traveling lane, except the number of traveling vehicles in the traveling lane of the host vehicle. The case of a branching section is similar to the case of the merging section.

A Case where a Viewing Target is an Intersection

If viewing target is an intersection, the stimulation intensity index calculation unit 16 calculates the stimulation intensity index of intersection based on the number of traveling vehicles at the intersection recognized by the traveling environment recognition unit 12. The range of the intersection in which the number of traveling vehicles is counted can be, for example, a range set as the intersection in advance on the map.

A Case where a Viewing Target is an Object

If the viewing target recognition unit 14 recognizes the object as a viewing target, the stimulation intensity index calculation unit 16 calculates the stimulation intensity index of the object based on the viewing area of the object. The stimulation intensity index calculation unit 16 recognizes the viewing area of the object in the driver's field of view G using well-known image processing based on the image captured by the camera. The stimulation intensity index calculation unit 16 calculates, for example, the viewing area of the object as the stimulation intensity index. If the object that is the viewing target is a traffic signal, the stimulation intensity index calculation unit 16 may calculate the stimulation intensity index based on the viewing area of the traffic signal and the brightness contrast of the traffic signal.

The viewing reaction index calculation unit 17 calculates a driver's viewing reaction index of the viewing target. The viewing reaction index is an index relating to a reaction of driver's line of sight to the viewing target. The viewing reaction index calculation unit 17 calculates the viewing reaction index based on the viewing target recognized by the viewing target recognition unit 14 and the driver's line of sight recognized by the driver's line of sight recognition unit 15.

The viewing reaction index calculation unit 17 calculates the viewing reaction index based on, for example, a reaction time (a reaction delay) from a time when the viewing target is recognized by the viewing target recognition unit 14 up to a time when the driver views the viewing target. When the driver's line of sight is determined to be located on the viewing target according to a well-known method, the viewing reaction index calculation unit 17 may recognize that the driver views the viewing target.

Here, FIG. 2B is a graph illustrating a temporal change of a lateral distance between the interruption vehicle Np and the host vehicle. The vertical axis in FIG. 2B represents the lateral distance between the interruption vehicle Np and the host vehicle, and the horizontal axis represents the time. FIG. 2B illustrates a time point t1 at which the viewing target recognition unit 14 recognizes the interruption vehicle Np as a viewing target. In FIG. 2B, when the lateral distance between the interruption vehicle Np and the host vehicle becomes equal to or shorter than 0.5 m, the viewing target recognition unit 14 recognizes the interruption vehicle as the viewing target.

FIG. 2C is a graph illustrating a temporal change of a distance from an area center of gravity of the viewing target to the line of sight. In FIG. 2C, the vertical axis represents the distance from the area center of gravity of the viewing target to the line of sight, and the horizontal axis represents the time. The distance from the area center of gravity of the viewing target to the line of sight means the distance from the area center of gravity of the viewing area of the viewing target to the driver's line of sight on the driver's field of view G. The area center of gravity is, for example, the center position of the viewing area of the viewing target. The viewing reaction index calculation unit 17 recognizes the distance from the area center of gravity of the viewing target to the line of sight using a well-known method based on the viewing target recognized by the viewing target recognition unit 14 and the driver's line of sight recognized by the driver's line of sight recognition unit 15.

FIG. 2C illustrates a time point t2 at which the viewing reaction index calculation unit 17 recognizes that the driver views the viewing target. In addition, an elapsed time $T_R$ from the time point t1 to the time point t2 is illustrated. The elapsed time $T_R$ corresponds to the reaction time up to a time when the driver views the viewing target. In the situations in FIG. 2B and FIG. 2C, the viewing reaction index calculation unit 17 calculates, for example, a reciprocal number of the reaction time up to the time when the driver views the viewing target as the viewing reaction index.

Here, the description is made for the case where the interruption vehicle Np is the viewing target, however, the reaction time up to the time when the driver views the viewing target can be used for the calculation of the viewing reaction index of all kinds of the viewing targets.

In addition, the viewing reaction index calculation unit 17 may calculate the viewing reaction index based on a result of determination whether or not the driver views the viewing target within a certain time from the time point at which the viewing target recognition unit 14 recognizes the viewing target. For example, if the viewing target recognition unit 14 recognizes the overtaking vehicle as a viewing target, the viewing reaction index calculation unit 17 determines whether or not the driver views the overtaking vehicle within a certain time from the recognized time point. If the driver views the overtaking vehicle within the certain time, the viewing reaction index calculation unit 17 calculates a value set in advance (for example, 1) as the viewing reaction index. If the driver does not view the overtaking vehicle within the certain time, the viewing reaction index calculation unit 17 calculates a value set in advance (for example, 0.1) as the viewing reaction index.

If the viewing target is the curve, the viewing reaction index calculation unit 17 may calculate the driver's viewing reaction index of the curve based on a length of time for the driver to view the end of the curve and a length of time of TP appearance. Here, FIG. 3 is a diagram for explaining a calculation of the viewing reaction index when the viewing target is a curve. FIG. 3 illustrates a curve R, a lane line L1 on the left side of the curve R, a lane line L2 on the right side of the curve R, the host vehicle M, the front direction DM of the host vehicle M, a tangent line $D_T$ extending from the host vehicle M, a tangent point TP which is an intersection of the tangent line $D_T$ and the lane line L2 inside the curve R, and dashed lines D1 and D2 extending across the tangent line DT. In addition, an angle between the front direction DM of the host vehicle and the tangent line $D_T$ is assumed to be $\theta_A$. For example, the curve R is a curve having a curvature radius equal to or shorter than 640 m within a distance 100 m from the host vehicle M and having a curve length equal to or longer than 60 m.

In FIG. 3, a start point of the tangent line $D_T$ extending from the host vehicle M is a driving seat of the host vehicle M. Start points of dashed lines D1 and D2 are the same. The dashed line D1 is a straight line obtained by moving the tangent line $D_T$ to the left side as much as a certain angle $\alpha 1$ (for example, 5 degrees) with the driving seat of the host vehicle M as a reference point. Similarly, the dashed line D2 is a straight line obtained by moving the tangent line $D_T$ to the right side as much as a certain angle $\alpha 2$ (for example, 5 degrees) with the driving seat of the host vehicle M as the reference point. $\alpha 1$ and $\alpha 2$ have the same value as an example.

In the situation in FIG. 3, if the driver's line of sight is positioned between the dashed line D1 and the dashed line D2, the viewing reaction index calculation unit 17 determines that the driver is viewing the end of the curve. The viewing reaction index calculation unit 17 counts the time during which the driver is viewing the end of the curve.

The viewing reaction index calculation unit 17 calculates the length of time of TP appearance, which is the length of time during which the driver can view the tangent point TP based on the vehicle state recognized by the vehicle state recognition unit 13, the position information of the host vehicle, and the map information. The viewing reaction index calculation unit 17 may start counting the length of time of TP appearance when the angle $\theta_A$ between the front direction $D_M$ of the host vehicle M and the tangent line $D_T$ becomes equal to or greater than a certain angle (for example, 10 degrees), and may end the count of the length of time of TP appearance when the angle $\theta_A$ between the front direction $D_M$ of the host vehicle M and the tangent line $D_T$ becomes smaller than the certain angle. For example, the viewing reaction index calculation unit 17 calculates a value obtained by dividing the length of time during which the driver is viewing the end of the curve by the length of time of TP appearance as the driver's viewing reaction index of the curve.

The driving readiness degree estimation unit 18 estimates the driver's driving readiness degree based on the stimulation intensity index of the viewing target calculated by the stimulation intensity index calculation unit 16 and the driver's viewing reaction index of the viewing target calculated by the viewing reaction index calculation unit 17.

The driving readiness degree estimation unit 18 estimates, for example, a value obtained by multiplying a value obtained by dividing the viewing reaction index by the stimulation intensity index by a coefficient set in advance as the driving readiness degree. This point is expressed as following Equation (1). In the Equation (1), αi is a coefficient set corresponding to the viewing target i in advance.

Equation (1)

$$\text{driving readiness degrees} = \alpha i \times \frac{\text{driver's viewing reaction index of the viewing target}}{\text{stimulation intensity index of the viewing target}} \quad (1)$$

The driving readiness degree estimation unit 18 estimates a plurality of driving readiness degrees for each viewing target and performs weighting of the driving readiness degrees according to the viewing target. The driving readiness degree estimation unit 18 performs weighting of the driving readiness degrees according to the stimulation intensity index of the viewing target. If the stimulation intensity index of the viewing target is smaller than a weighting threshold value, the driving readiness degree estimation unit 18 increases the weighting value of the driving readiness degrees of the viewing target compared to a case where the stimulation intensity index is equal to or greater than the weighting threshold value. The weighting threshold value is a threshold value set in advance. The driving readiness degree estimation unit 18 may increase the weighting value of the driving readiness degree of the viewing target as the stimulation intensity index of the viewing target increases.

The driving readiness degree estimation unit 18 may weight the driving readiness degrees according to the viewing area of the viewing target. If the viewing area of the viewing target is smaller than a viewing area threshold value, even if the stimulation intensity index is large, since it is considered that overlooking is likely to occur, the driving readiness degree estimation unit 18 may decrease the driving readiness degree weighting value compared to a case where the viewing area of the viewing target is equal to or greater than the viewing area threshold value. The viewing area threshold value is a value set in advance. The driving readiness degree estimation unit 18 may weight the driving readiness degrees according to the viewing area only when the viewing target is the viewing target vehicle or the object. In addition, if the viewing target is the curve, the driving readiness degree estimation unit 18 may weight the driving readiness degrees according to the curvature of the curve. The driving readiness degree estimation unit 18 may increase the driving readiness degree weighting value as the curvature of curve increases.

If a plurality of driving readiness degrees are estimated within a time set in advance, the driving readiness degree estimation unit 18 integrates the plurality of driving readiness degrees and calculates an integrated driving readiness degree. For example, within the time set in advance means within a certain time from the time point (current time point) at which the calculation of integrated driving readiness degree starts. The integrated driving readiness degree can be calculated as following Equation (2). βi is a weighting coefficient for calculating the integrated driving readiness degree each viewing target. n is the number of viewing targets that appeared within the certain time. m is the total number of types of the viewing target that appeared within the certain time.

Equation (2)

$$\text{plurality of driving readiness degrees} = \frac{\sum_{i=1}^{m} \beta i \times \frac{\sum_{k=1}^{n} \alpha i \times \frac{\text{driver's viewing reaction index of the viewing target}}{\text{stimulation intensity index of the viewing target}}}{n}}{\sum_{i=1}^{m} \beta i} \quad (2)$$

Figure 4A:
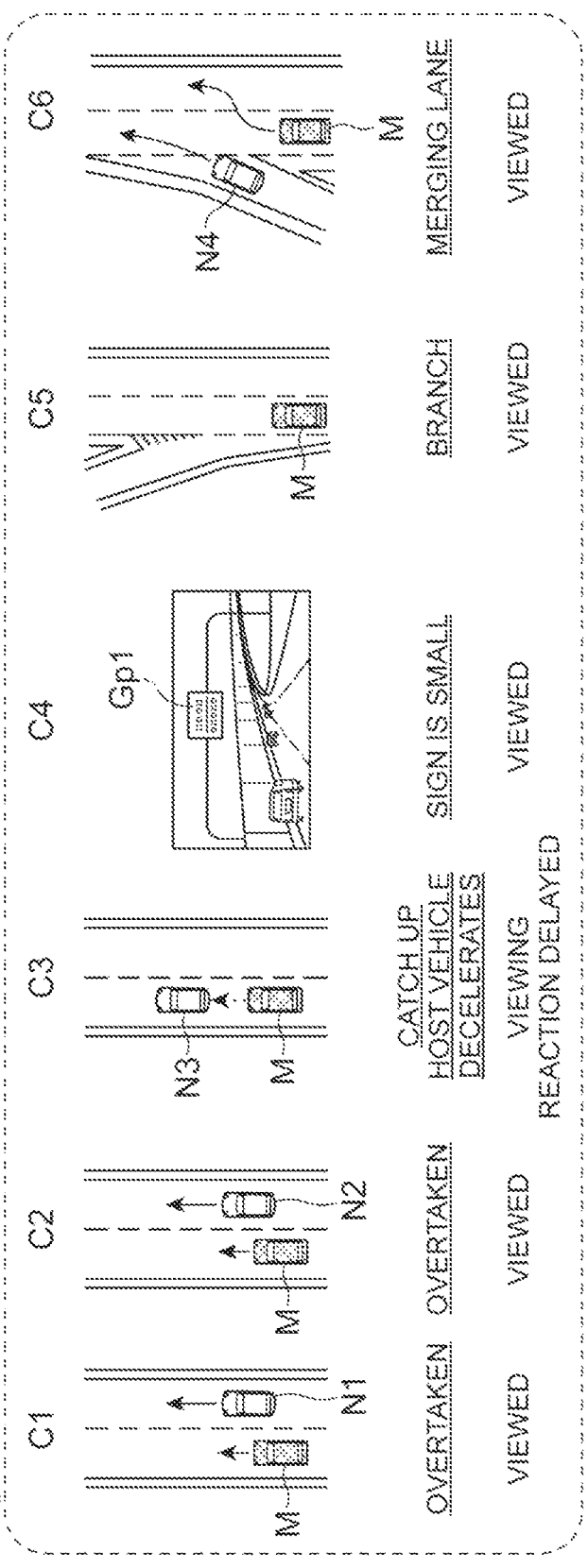
FIG. 4A is a diagram illustrating an example of a plurality of viewing targets appearing when a host vehicle M is traveling by autonomous driving.

Here, FIG. 4A is a diagram illustrating an example of a plurality of viewing targets appearing when a host vehicle M is traveling by autonomous driving. FIG. 4A illustrates situations C1 to C6 in which the viewing targets appear. The situation C1 is a situation in which the host vehicle M is overtaken by an overtaking vehicle N1 which is the viewing target. The situation C2 is a situation in which the host vehicle M is overtaken by an overtaking vehicle N2 which is the viewing target. The situation C3 is a situation in which the host vehicle M catches up with the preceding vehicle N3 and decelerates, and thus, the preceding vehicle becomes the viewing target.

The situation C4 is a situation in which the host vehicle M passes through sign a Gp1 which is the viewing target. Since the sign Gp1 is a slightly small sign, the stimulation intensity index has a small value. The situation C5 is a situation in which the host vehicle M travels a branching section which is the viewing target. The situation C6 is a situation in which the host vehicle M travels a merging section which is the viewing target. In the situation C6, another vehicle N4 is present on the lane merging to the traveling lane of host vehicle M, the host vehicle M in autonomous driving changes the lane so as to avoid another vehicle N4.

Figure 4B:
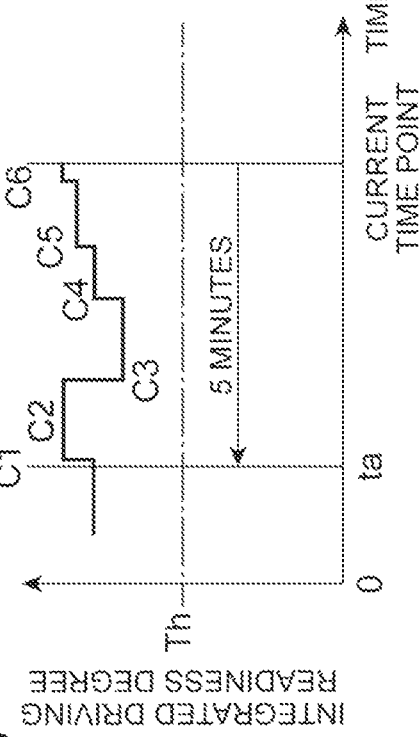
FIG. 4B is a graph illustrating a temporal change of an integrated driving readiness degree corresponding to an example of the plurality of viewing targets.

FIG. 4B is a graph illustrating a temporal change of the integrated driving readiness degree corresponding to examples of the plurality of viewing targets. The vertical axis in FIG. 4B represents the integrated driving readiness degree and the horizontal axis represents the time. As illustrated in FIG. 4B, the driving readiness degree estimation unit 18 can obtain the integrated driving readiness degree from Equation (2) described above using the stimulation intensity index and the viewing reaction index of the viewing targets appearing in the past 5 minutes from the current time point.

The threshold value Th illustrated in FIG. 4B is a threshold value for awakening an attention as an example. If the integrated driving readiness degree is equal to or lower than the threshold value Th, the driving readiness degree estimation unit 18 may perform awakening of the driver's attention that the driving consciousness is decreasing. The driving readiness degree estimation unit 18 transmits a control signal to the HMI 6 and performs awakening of the driver's attention by displaying an image on a display and/or outputting a sound from a speaker. If a vibration mechanism is prepared on a driver's seat, the driving readiness degree estimation unit 18 may awaken the driver's attention using a vibration.

As illustrated in FIG. 4A and FIG. 4B, the driving readiness degree estimation unit 18 increases the integrated driving readiness degree because the driver viewed the overtaking vehicle N1 in the situation C1. The driving readiness degree estimation unit 18 maintains the integrated driving readiness degree because the driver also viewed the overtaking vehicle N2 in the situation C2. In the situation C3, since the host vehicle M decelerates after catching up with the preceding vehicle N3 but the driver's visual reaction is in mid-level, the driving readiness degree estimation unit 18 slightly decreases the integrated driving readiness degree. In the situation C4, since the driver viewed the sign Gp1, the driving readiness degree estimation unit 18 slightly increases the integrated driving readiness degree. In the situation C5, since the driver viewed the branching section, the driving readiness degree estimation unit 18 slightly increases the integrated driving readiness degree. Similarly, in the situation C6, since the driver viewed the merging section, the driving readiness degree estimation unit 18 slightly decreases the integrated driving readiness degree.

Figure 5A:
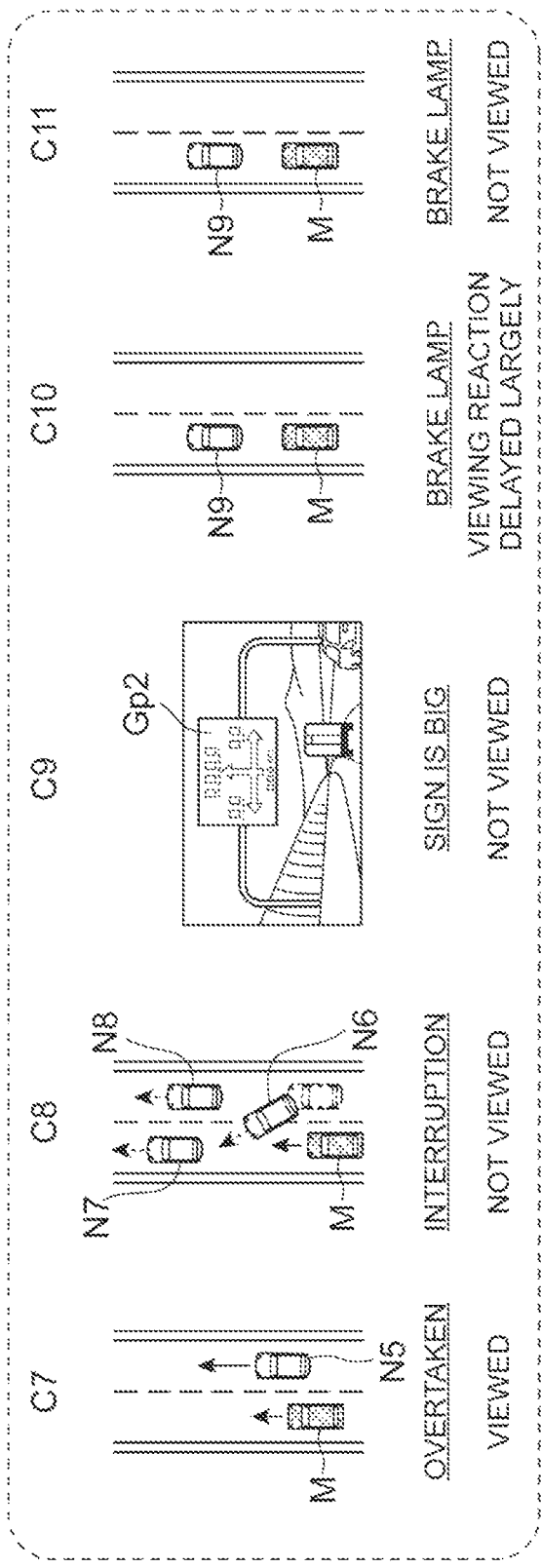
FIG. 5A is a diagram illustrating another example of a plurality of viewing targets appearing when the host vehicle M is traveling by autonomous driving.

Subsequently, FIG. 5A is a diagram illustrating another example of a plurality of viewing targets appearing when the host vehicle M is traveling by the autonomous driving. FIG. 5A illustrates situations C7 to C11 in which the viewing targets appear. The situation C7 is a situation in which the host vehicle M is overtaken by an overtaking vehicle N5 which is a viewing target. The situation C8 is a situation in which an interruption vehicle N6 which is the viewing target interrupts between the host vehicle M and the preceding vehicle N7. The situation C9 is a situation in which the host vehicle M passes through sign Gp2 which is the viewing target. Since the sign Gp2 is a sign that is larger than the sign Gp1 in FIG. 4A, the stimulation intensity index also has a large value. The situation C10 is a situation in which the preceding vehicle N9 is braking and the brake lamp lights up. The situation C11 is a situation in which the same preceding vehicle N9 is braking again and the brake lamp lights up.

Figure 5B:
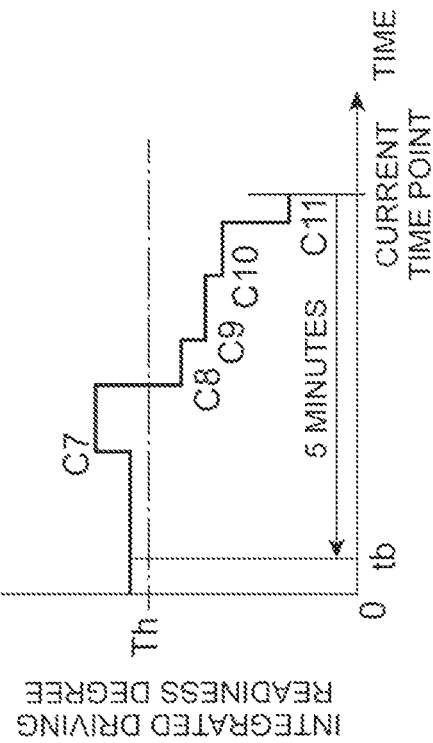
FIG. 5B is a graph illustrating a temporal change of an integrated driving readiness degree corresponding to another example of the plurality of viewing targets.

FIG. 5B is a graph illustrating a temporal change of the integrated driving readiness degree corresponding to other examples of the plurality of viewing targets. The vertical axis in FIG. 5B represents the integrated driving readiness degree and the horizontal axis represents the time. As illustrated in FIG. 5A and FIG. 5B, since the driver viewed the overtaking vehicle N5 in the situation C7, the driving readiness degree estimation unit 18 increases the integrated driving readiness degree. Since the driver did not view the interruption vehicle N6 in the situation C8, the driving readiness degree estimation unit 18 greatly decreases the integrated driving readiness degree. At this time, since integrated driving readiness degree becomes equal to or smaller than the threshold value Th, the driving readiness degree estimation unit 18 may awaken the driver that the driver's driving consciousness is decreasing.

Since the driver did not view the sign Gp2 in the situation C9, the driving readiness degree estimation unit 18 further decreases the integrated driving readiness degree. Since the driver's viewing of the braking preceding vehicle N9 was greatly delayed in the situation C10, the driving readiness degree estimation unit 18 slightly decreases the integrated driving readiness degree. Since the driver did not view the braking preceding vehicle N9 in the situation C11, the driving readiness degree estimation unit 18 further decreases the integrated driving readiness degree.

The driving readiness degree estimation unit 18 does not necessarily need to calculate the integrated driving readiness degree using Equation (2) described above. If the same types of viewing targets appear multiple times within a time set in advance, the driving readiness degree estimation unit 18 may calculate an average value of the driving readiness degrees estimated multiple times from each viewing target as the integrated driving readiness degree.

The type of viewing targets can be divided in detail into the interruption vehicle, the overtaking vehicle, the braking preceding vehicle, the preceding vehicle causing the host vehicle in autonomous driving to change the speed, the road shape, the object, and the like. As the type of viewing targets, the road shape may be further divided in detail and the object may be further divided in detail. If the same types of viewing targets appear multiple times within a time set in advance, and if the viewing reaction indices of the viewing targets are expressed by same criteria, the driving readiness degree estimation unit 18 may calculate the average value of the driving readiness degrees estimated multiple times from the plural types of viewing targets as integrated driving readiness degree. The case where the viewing reaction indices of the viewing targets are expressed by the same criteria, is, for example, a case where a plurality of viewing reaction indices are expressed by the reaction time, or a case where the viewing reaction indices are expressed by a viewing frequency (certainty of viewing). The integrated driving readiness degree may not be the average value, but may be weighted to be increased for the driving readiness degree estimated later (the driving readiness degree closer to the current time point), and then, may be calculated such that the value becomes closer to the driving readiness degree estimated later.

In addition, the driving readiness degree estimation unit 18 does not necessarily need to calculate the integrated driving readiness degree. If the current driving readiness degree becomes equal to or lower than the threshold value for awakening the attention, the driving readiness degree estimation unit 18 may awaken the driver that the driving consciousness is decreasing. If the integrated driving readiness degree or the driving readiness degree is equal to or lower than the threshold value Th, the driving readiness degree estimation unit 18 may change the contents of autonomous driving by transmitting a signal to the autonomous drive ECU 7. The driving readiness degree estimation unit 18 does not necessarily need to estimate the driving readiness degrees multiple times for each viewing target, and does not necessarily need to perform weighting.

Driving Readiness Degree Estimation Processing in First Embodiment

Next, the driving readiness degree estimation processing by the driving consciousness estimation device 100 in the first embodiment will be described with reference to FIG. 6. FIG. 6 is a flowchart illustrating the driving readiness degree estimation processing by the driving consciousness estimation device 100. The processing illustrated in the flowchart in FIG. 6 starts, for example, when the autonomous driving is performed. The processing illustrated in the flowchart in FIG. 6 may start at the time when the driving support control such as an adaptive cruise control [ACC], a lane keeping assist [LKA], or the like is executed, or at the time of manual driving by the driver.

As illustrated in FIG. 6, the ECU 10 of the driving consciousness estimation device 100 determines whether or not a viewing target is recognized by the viewing target recognition unit 14 as S10. The viewing target recognition unit 14 recognizes the viewing target used for estimating the driver's driving readiness degree based on the traveling environment recognized by the traveling environment recognition unit 12.

If it is determined that the viewing target is not recognized (No in S10), the ECU 10 ends the current processing. Thereafter, if an ending condition set in advance is not satisfied, the ECU 10 repeats the determination from S10 again after a certain time. The ending condition is satisfied, for example, when the autonomous driving is ended or when the ignition of the host vehicle M is off. If it is determined that the viewing target is recognized (YES in S10), the ECU 10 moves the processing to S12.

In S12, the ECU 10 calculates the stimulation intensity index of the viewing target using the stimulation intensity index calculation unit 16. If the viewing target is another vehicle (a viewing target vehicle), the stimulation intensity index calculation unit 16 calculates the stimulation intensity index of the viewing target vehicle based on at least one of the relative situation of the host vehicle and the viewing target vehicle and the viewing area of the viewing target vehicle. If the viewing target is a road shape, the stimulation intensity index calculation unit 16 calculates the stimulation intensity index of the road shape based on the curvature of the road shape or the number of traveling vehicles in the road shape. If the viewing target is an object, the stimulation intensity index calculation unit 16 calculates the stimulation intensity index of the object based on the viewing area of the object.

In S14, the ECU 10 calculates the driver's viewing reaction index of the viewing target using the viewing reaction index calculation unit 17. The viewing reaction index calculation unit 17 calculates the viewing reaction index based on the viewing target recognized by the viewing target recognition unit 14 and the driver's line of sight recognized by the driver's line of sight recognition unit 15.

In S16, the ECU 10 estimates the driving readiness degree using the driving readiness degree estimation unit 18. The driving readiness degree estimation unit 18 estimates the driver's driving readiness degree based on the stimulation intensity index of the viewing target calculated by the stimulation intensity index calculation unit 16 and the driver's viewing reaction index of the viewing target calculated by the viewing reaction index calculation unit 17. The driving readiness degree estimation unit 18 estimates the driving readiness degree using, for example, Equation (1) described above. The driving readiness degree estimation unit 18 may calculate the integrated driving readiness degree using, for example, Equation (2) described above.

Operational Effects of Driving Consciousness Estimation Device in First Embodiment According to the driving consciousness estimation device 100 in the first embodiment described above, since it can be considered that the viewing reaction to the viewing target such as an interruption vehicle in front of the host vehicle of a driver having a high driving consciousness is faster than that by a driver having a low driving consciousness, it is possible to appropriately estimate the driving readiness degree relating to the driver's driving consciousness based on the viewing reaction index.

In addition, according to the driving consciousness estimation device 100, since it can be considered that the driver's reaction changes depending on the stimulus given to the driver as the viewing target, it is possible to appropriately estimate the driving readiness degree while considering the stimulation intensity index of viewing target.

Specifically, if the viewing target is another vehicle (a viewing target vehicle), the driving consciousness estimation device 100 can appropriately estimate the driving readiness degree while considering the relative situation between the viewing target vehicle and the host vehicle and/or the stimulation intensity index of the viewing target vehicle calculated from the viewing area of the viewing target vehicle. In addition, if the viewing target is a road shape such as a curve, a merging section, or the like, the driving consciousness estimation device 100 can appropriately estimate the driving readiness degree while considering the stimulation intensity index of the viewing target calculated from the curvature radius and/or the number of traveling vehicles in the road shape. If the viewing target is an object such as a sign, the driving consciousness estimation device 100 can appropriately estimate the driving readiness degree while considering the viewing area of the object on the road.

In addition, the driving consciousness estimation device 100 calculates the integrated driving readiness degree from the driving readiness degrees estimated multiple times for each viewing target and the weighted driving readiness degree according to the viewing target, and thus, it is possible to avoid a problem in that the driver's driving consciousness is estimated to be excessively low due to a temporary overlooking. Therefore, it becomes possible to output the integrated driving readiness degree relating to overall driver's driving consciousness within a time set in advance.

Second Embodiment

Figure 7:
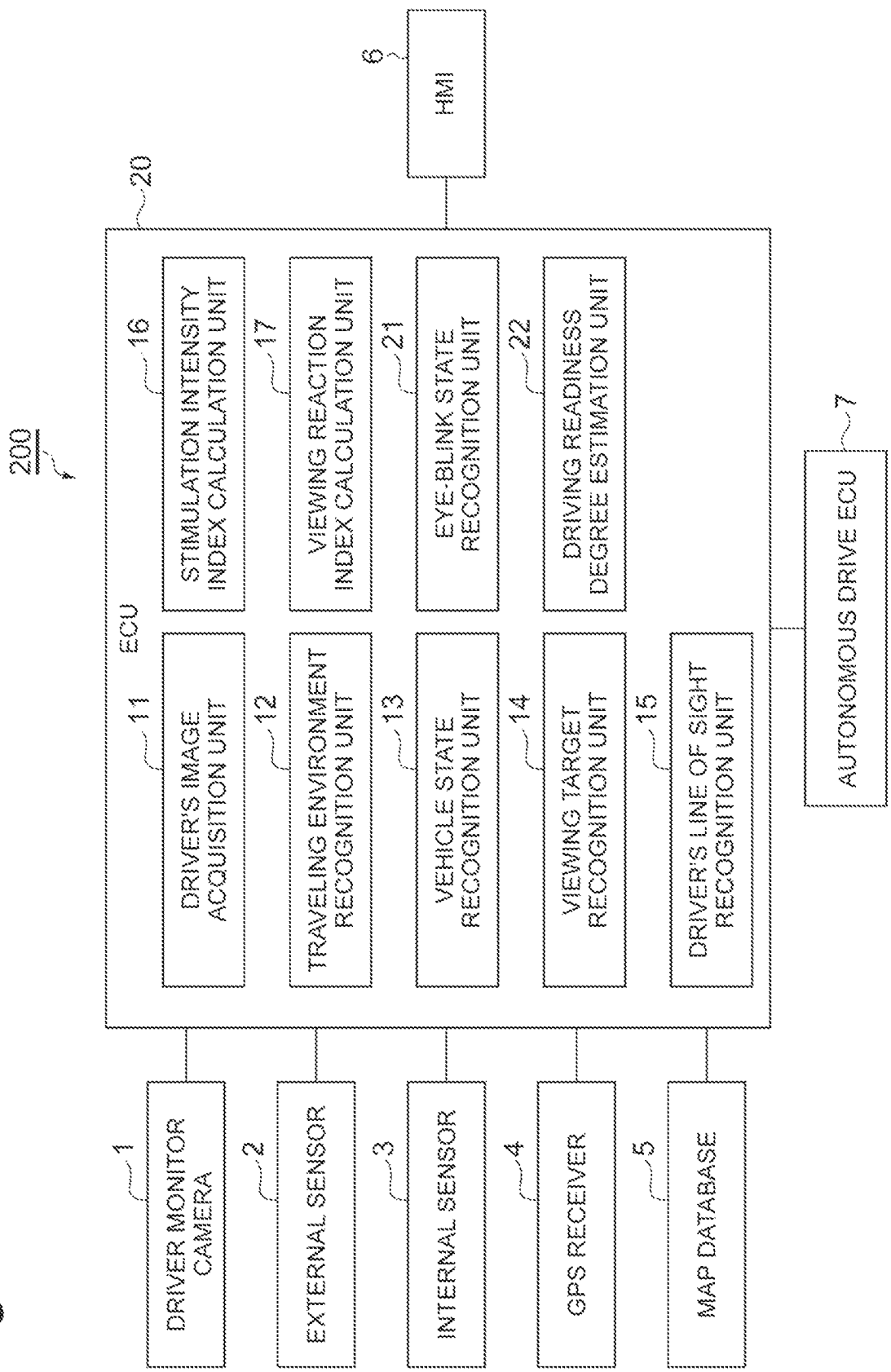
FIG. 7 is a block diagram illustrating a driving consciousness estimation device in a second embodiment.

FIG. 7 is a block diagram illustrating a driving consciousness estimation device in a second embodiment. A driving consciousness estimation device 200 in the second embodiment illustrated in FIG. 7 is different from the driving consciousness estimation device in the first embodiment in a point that the driving readiness degree is corrected based on a driver's eye-blink state.

Configuration of Driving Consciousness Estimation Device in Second Embodiment

Specifically, an ECU 20 of the driving consciousness estimation device 200 illustrated in FIG. 7 is different from the ECU in the first embodiment in points that the ECU 20 includes an eye-blink state recognition unit 21 and the function of the driving readiness degree estimation unit 22 is different. The same reference numerals are given to the configuration elements same or equivalent to those in the first embodiment, and the descriptions thereof will be omitted.

The eye-blink state recognition unit 21 recognizes the driver's eye-blink state based on a driver's image acquired by the driver's image acquisition unit 11 using well-known image processing. At least a length of eye-blink time is included in the eye-blink state. The length of eye-blink time means the length of time for one eye-blink. The number eye-blinks per a certain time may be included in the eye-blink state.

The driving readiness degree estimation unit 22 corrects the driving readiness degree based on the driver's eye-blink state recognized by the eye-blink state recognition unit 21. The driving readiness degree estimation unit 22 can correct the driving readiness degree using an arithmetic equation or table data set in advance. Here, the driving readiness degree estimation unit 22 corrects the driver's driving readiness degree corresponding to the viewing target based on the driver's eye-blink state while the viewing reaction index calculation unit 17 determines that the driver is viewing the viewing target.

Specifically, the driving readiness degree estimation unit 22 corrects the driving readiness degree according to, for example, the following Equation (3). In Equation (3), a reference length of eye-blink time is fixed value set in advance. An average length of eye-blink time is an average value of the length of eye-blink time while the driver is viewing the viewing target.

Equation (3)

$$\text{corrected driving readiness degrees} = \text{driving readiness degrees} \times \frac{\text{reference length of eye-blink time (fixed value)}}{\text{average value of the length of eye-blink time}} \quad (3)$$

If the average length of eye-blink time is equal to or longer than the reference length of eye-blink time, the driving readiness degree estimation unit 22 may correct the driving readiness degree by multiplying the driving readiness degree by a predetermined coefficient (a coefficient equal to or greater than 0 and smaller than 1). If a driver having a high driving consciousness views a viewing target (when viewing an target of interest), since the number of eye-blinks per a certain time decreases, the driving readiness degree estimation unit 22 may perform the correction to increase the driving readiness degree when the number eye-blinks per a certain time is a predetermined threshold value. The driving readiness degree estimation unit 22 may correct the driving readiness degree based on the driver's eye-blink state of a certain time regardless of whether the driver is viewing the viewing target or not.

Driving Consciousness Estimation Processing in Second Embodiment

Figure 8:
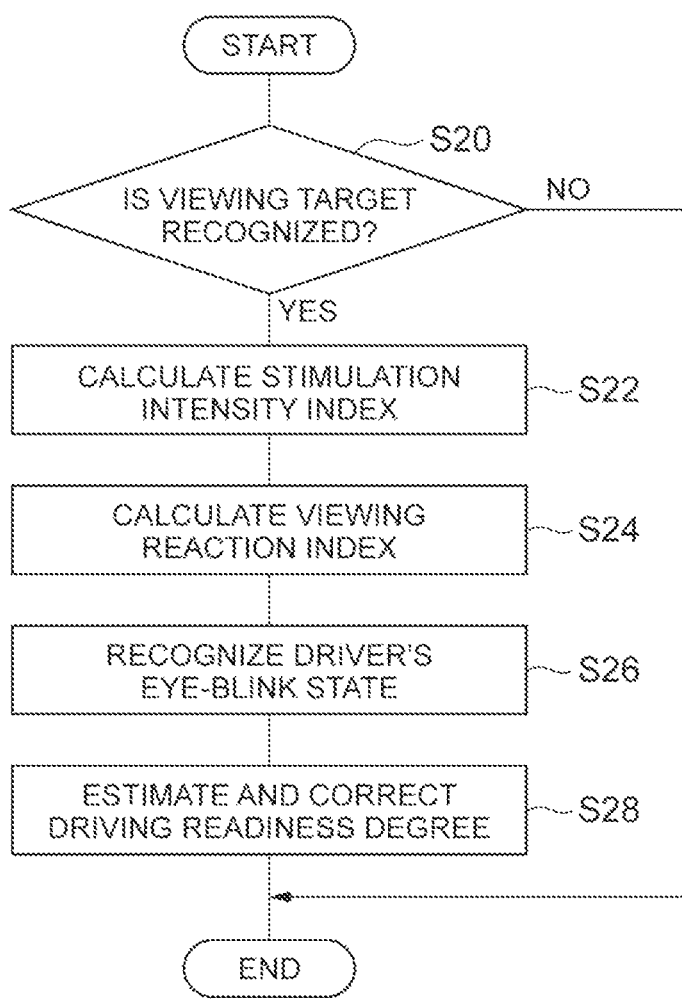
FIG. 8 is a flowchart illustrating driving readiness degree estimation processing by the driving consciousness estimation device in the second embodiment.

Next, the driving consciousness estimation processing by the driving consciousness estimation device 200 in the second embodiment will be described with reference to FIG. 8. FIG. 8 is a flowchart illustrating driving readiness degree estimation processing by the driving consciousness estimation device 200 in the second embodiment. The processing in the flowchart illustrated in FIG. 8 can be started under the same condition as the flowchart in the first embodiment illustrated in FIG. 6. Since S20 to S24 in FIG. 8 are the same as S10 to S14 in FIG. 6, the description thereof will be simplified.

As illustrated in FIG. 8, the ECU 20 of the driving consciousness estimation device 200 determines whether or not a viewing target is recognized by the viewing target recognition unit 14 as S20. If it is determined that the viewing target is not recognized (No in S20), the ECU 20 ends the current processing. Thereafter, if an ending condition set in advance is not satisfied, the ECU 20 repeats the determination from S20 again after a certain time. If it is determined that the viewing target is recognized (YES in S20), the ECU 20 moves the processing to S22.

In S22, the ECU 20 calculates the stimulation intensity index of the viewing target using the stimulation intensity index calculation unit 16. In S24, the ECU 20 calculates the driver's viewing reaction index of the viewing target using the viewing reaction index calculation unit 17.

In S26, the ECU 20 recognizes the driver's eye-blink state using the eye-blink state recognition unit 21. The eye-blink state recognition unit 21 recognizes the driver's eye-blink state based on the driver's image acquired by the driver's image acquisition unit 11 using well-known image processing.

In S28, the ECU 20 estimates and corrects the driving readiness degree using the driving readiness degree estimation unit 22. The driving readiness degree estimation unit 22 estimates the driving readiness degree in the same way as that of the driving readiness degree estimation unit 18 in the first embodiment. The driving readiness degree estimation unit 22 corrects the driving readiness degree based on the driver's eye-blink state recognized by the eye-blink state recognition unit 21. The driving readiness degree estimation unit 22 corrects the driving readiness degree using, for example, the Equation (3) described above.

Operational Effects of Driving Consciousness Estimation Device in Second Embodiment According to the driving consciousness estimation device 200 in the second embodiment described above, since the driver's eye-blink state changes according to the driving consciousness, the driving readiness degree is corrected based on the eye-blink state. Therefore, it is possible to avoid a problem in that the driving readiness degree is erroneously estimated to be high when the driver views the direction of the viewing target by accident while maintaining a low driving consciousness. Therefore, it is possible to appropriately estimate the driving readiness degree.

Third Embodiment

Figure 9:
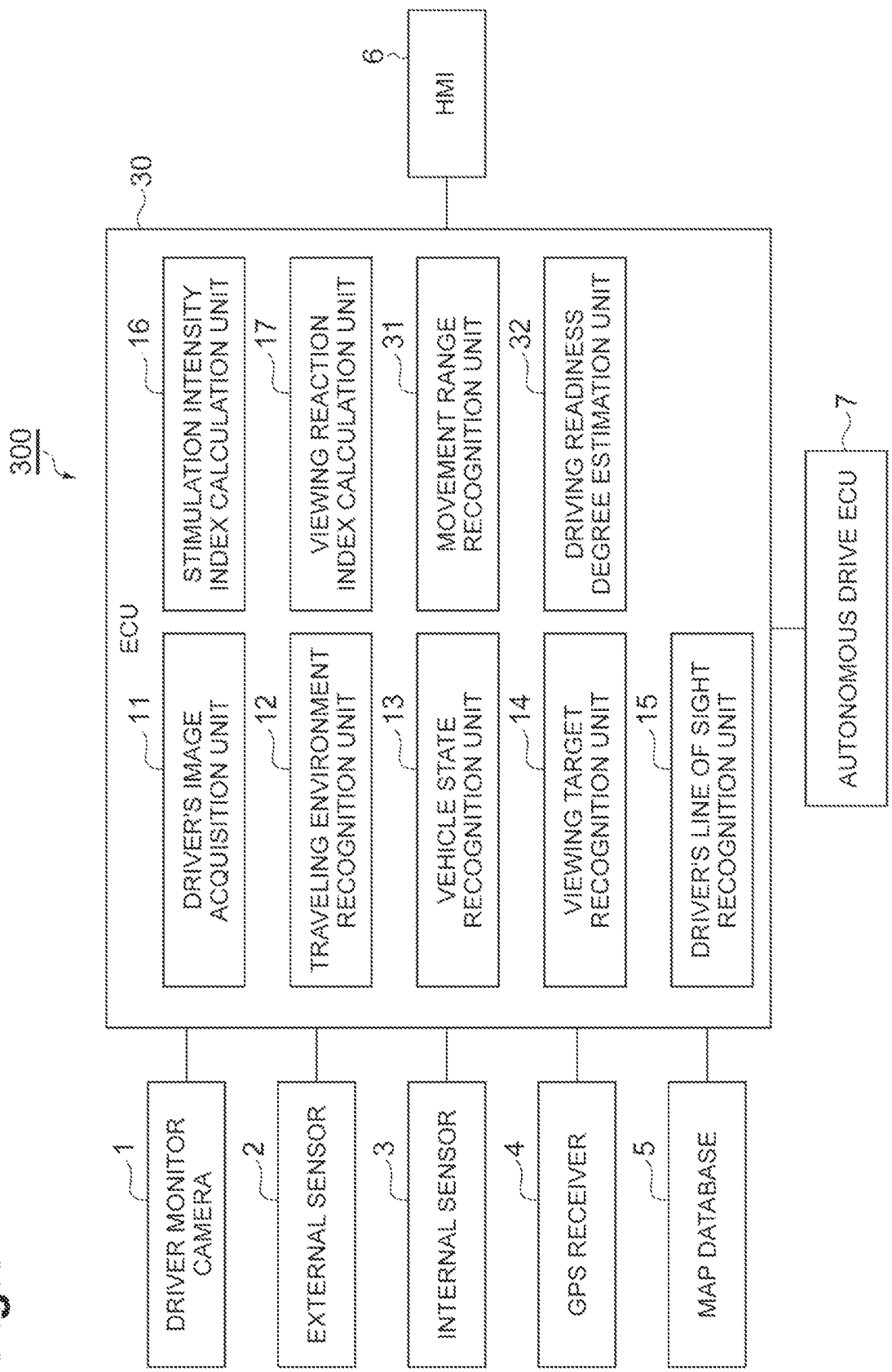
FIG. 9 is a block diagram illustrating a driving consciousness estimation device in a third embodiment.

FIG. 9 is a block diagram illustrating a driving consciousness estimation device in a third embodiment. A driving consciousness estimation device 300 in the third embodiment illustrated in FIG. 9 is different from the driving consciousness estimation device in the first embodiment in a point that the driving readiness degree is corrected based on a movement range of the driver's line of sight.

Configuration of Driving Consciousness Estimation Device in Third Embodiment

Specifically, an ECU 30 of the driving consciousness estimation device 300 illustrated in FIG. 9 is different from the ECU in the first embodiment in points that the ECU 30 includes a movement range recognition unit 31 and the function of the driving readiness degree estimation unit 32 is different. The same reference numerals are given to the configuration elements same or equivalent to those in the first embodiment, and the descriptions thereof will be omitted.

The movement range recognition unit 31 recognizes a movement range which is a range the driver's line of sight has moved, based on the driver's image acquired by the driver's image acquisition unit 11 and the image captured by the camera of the external sensor 2 using a well-known method. The movement range recognition unit 31 recognizes the movement range of the driver's line of sight, for example, from the current time point to a certain time past. The movement range of the driver's line of sight is a range that includes a movement trajectory of driver's line of sight (the view point) on the driver's field of view G.

Figure 10A:
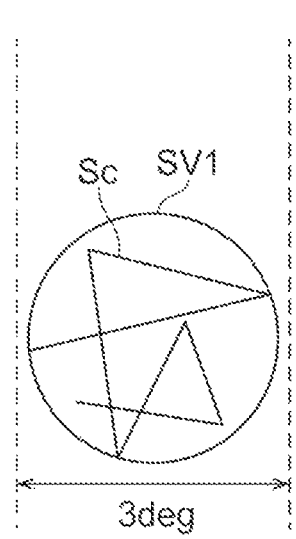
FIG. 10A is a diagram illustrating an example of a movement range of a driver's line of sight.

Here, FIG. 10A is a diagram illustrating an example of the movement range of the driver's line of sight. FIG. 10A illustrates a movement trajectory Sc of the driver's line of sight and a movement range SV1 of the driver's line of sight from the current time point to a certain time past. The meaning of 3 degrees in FIG. 10A will be described later. As illustrated in FIG. 10A, the movement range recognition unit 31 may detect the movement trajectory Sc of the line of sight in the driver's of field of view G, and may recognize the movement range SV1 as a minimum circular range including the movement trajectory Sc.

The driving readiness degree estimation unit 32 corrects the driving readiness degree based on the movement range of the driver's line of sight recognized by the movement range recognition unit 31. For example, if the diameter of the movement range of the driver's line of sight recognized as the circular range by the movement range recognition unit 31 is smaller than a movement range threshold value, since the driver having a low driving consciousness may view the viewing target by accident, the driving readiness degree estimation unit 32 corrects the driving readiness degree to a small value. If the diameter of the movement range of the driver's line of sight is equal to or greater than the movement range threshold value, the driving readiness degree estimation unit 32 does not correct the driving readiness degree. The movement range threshold value is a threshold value set in advance, and can be set to 3 degrees, for example.

Figure 10B:
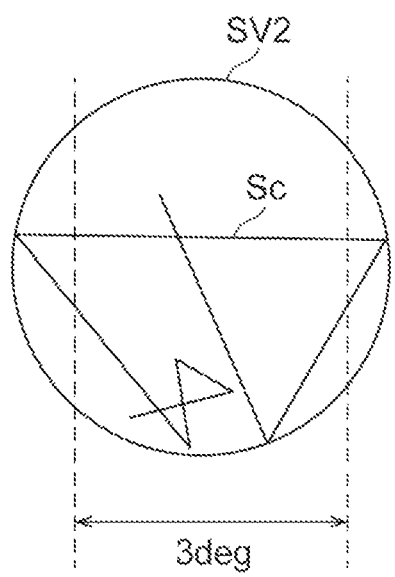
FIG. 10B is a diagram illustrating another example of a movement range of the driver's line of sight.

Since the diameter of the movement range SV1 of the driver's line of sight in FIG. 10A is smaller than 3 degrees, the driving readiness degree estimation unit 32 corrects the driving readiness degree. The driving readiness degree estimation unit 32 corrects the driving readiness degree by, for example, multiplying the driving readiness degree by a predetermined coefficient (a coefficient equal to or greater than 0 and smaller than 1). On the other hand, FIG. 10B is a diagram illustrating another example of the movement range of the driver's line of sight. The movement range SV2 in FIG. 10B is larger than the movement range SV1 in FIG. 10A and the diameter is greater than 3 degrees. Therefore, the driving readiness degree estimation unit 32 does not correct the driving readiness degree based on the movement range SV2 of the driver's line of sight in FIG. 10B.

The driving readiness degree estimation unit 32 may correct the driving readiness degree according to following Equation (4).

Equation (4)

$$\text{corrected driving readiness degrees} = \text{driving readiness degrees} \times \frac{1}{\left(\frac{\text{movement range threshold value}}{\text{diameter of the movement range}}\right)} \quad (4)$$

Driving Consciousness Estimation Processing in Third Embodiment

Next, the driving consciousness estimation processing by the driving consciousness estimation device 300 in the third embodiment will be described with reference to FIG. 11.

Figure 11:
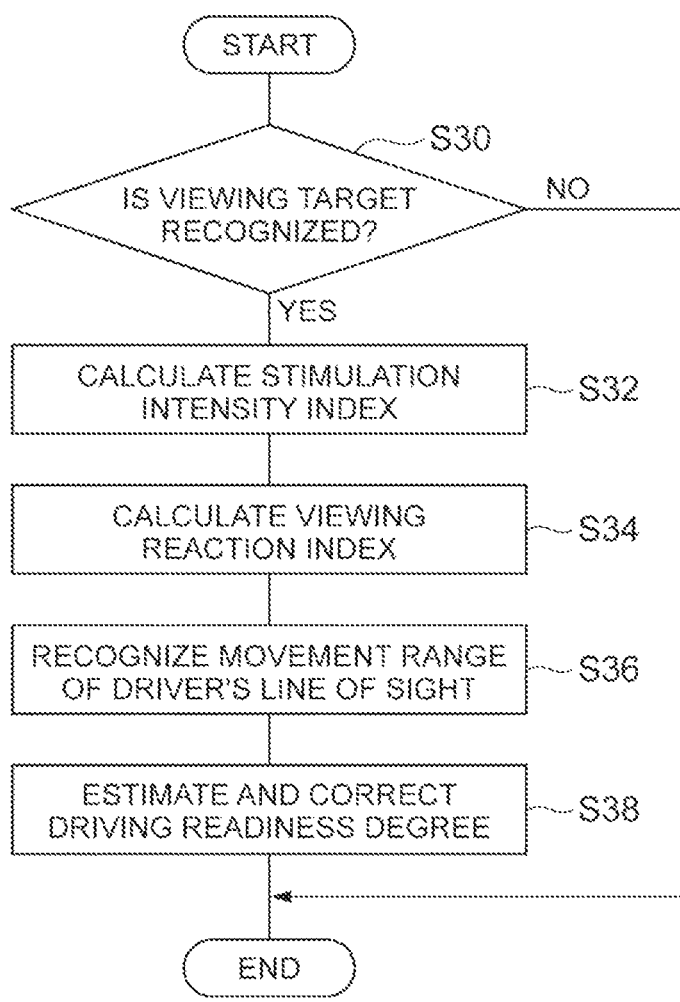
FIG. 11 is a flowchart illustrating driving readiness degree estimation processing by the driving consciousness estimation device in the third embodiment.

FIG. 11 is a flowchart illustrating the driving readiness degree estimation processing by the driving consciousness estimation device 300 in the third embodiment. The processing in the flowchart illustrated in FIG. 11 can be started under the condition the same as the flowchart in the first embodiment illustrated in FIG. 6. Since S30 to S34 in FIG. 11 are the same as S10 to S14 in FIG. 6, the description thereof will be simplified.

As illustrated in FIG. 11, the ECU 30 of the driving consciousness estimation device 300 determines whether or not a viewing target is recognized by the viewing target recognition unit 14 as S30. If it is determined that the viewing target is not recognized (No in S30), the ECU 30 ends the current processing. Thereafter, if an ending condition set in advance is not satisfied, the ECU 30 repeats the determination from S30 again after a certain time. If it is determined that the viewing target is recognized (YES in S30), the ECU 30 moves the processing to S32.

In S32, the ECU 30 calculates the stimulation intensity index of the viewing target using the stimulation intensity index calculation unit 16. In S34, the ECU 30 calculates the driver's viewing reaction index of the viewing target using the viewing reaction index calculation unit 17.

In S36, the ECU 30 recognizes the movement range of the driver's line of sight using the movement range recognition unit 31. The movement range recognition unit 31 recognizes the movement range which is a range in which the driver's line of sight is moved during a period from the current time point to a certain time past, based on the driver's image acquired by the driver's image acquisition unit 11 and the image captured by the camera of the external sensor 2 using a well-known method.

In S38, the ECU 30 estimates and corrects the driving readiness degree using the driving readiness degree estimation unit 32. The driving readiness degree estimation unit 32 estimates the driving readiness degree in the same way used by the driving readiness degree estimation unit 18 in the first embodiment. The driving readiness degree estimation unit 32 corrects the driving readiness degree based on the movement range of the driver's line of sight recognized by the movement range recognition unit 31. For example, if the diameter of the movement range of the driver's line of sight is equal to or greater than the movement range threshold value, the driving readiness degree estimation unit 32 does not correct the driving readiness degree. If the diameter of the movement range of the driver's line of sight is smaller than the movement range threshold value, the driving readiness degree estimation unit 32 corrects the driving readiness degree to a small value by multiplying the driving readiness degree by the predetermined coefficient.

Operational Effects of Driving Consciousness Estimation Device in Third Embodiment According to the driving consciousness estimation device 300 in the third embodiment described above, since the movement range of the driver's line of sight changes according to the driving consciousness, the driving readiness degree is corrected based on the movement range. Therefore, it is possible to avoid a problem in that the driving readiness degree is erroneously estimated to be high when the driver views the direction of the viewing target by accident while maintaining the low driving consciousness. Therefore, it is possible to appropriately estimate the driving readiness degree.

Fourth Embodiment

Figure 12:
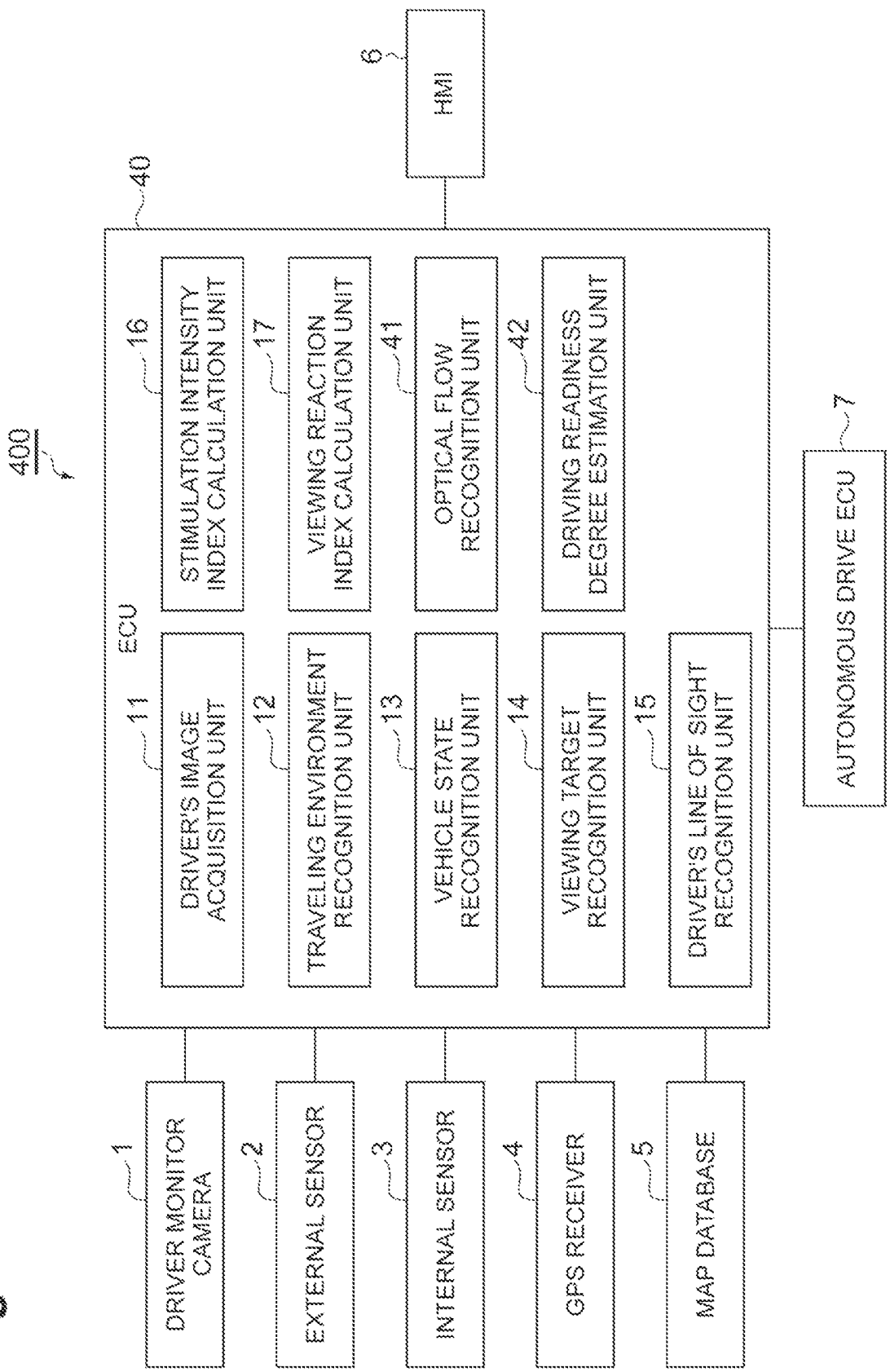
FIG. 12 is a block diagram illustrating a driving consciousness estimation device in a fourth embodiment.

FIG. 12 is a block diagram illustrating a driving consciousness estimation device in a fourth embodiment. A driving consciousness estimation device 400 in the fourth embodiment illustrated in FIG. 12 is different from the driving consciousness estimation device in the first embodiment in a point that the driving readiness degree is corrected based on a movement range of the driver's line of sight.

Configuration of Driving Consciousness Estimation Device in Fourth Embodiment

Specifically, an ECU 40 of the driving consciousness estimation device 400 illustrated in FIG. 12 is different from the ECU in the first embodiment in points that the ECU 40 includes an optical flow recognition unit 41 and the function of the driving readiness degree estimation unit 42 is different.

The same reference numerals are given to the configuration elements same or equivalent to those in the first embodiment, and the descriptions thereof will be omitted.

Figure 13:
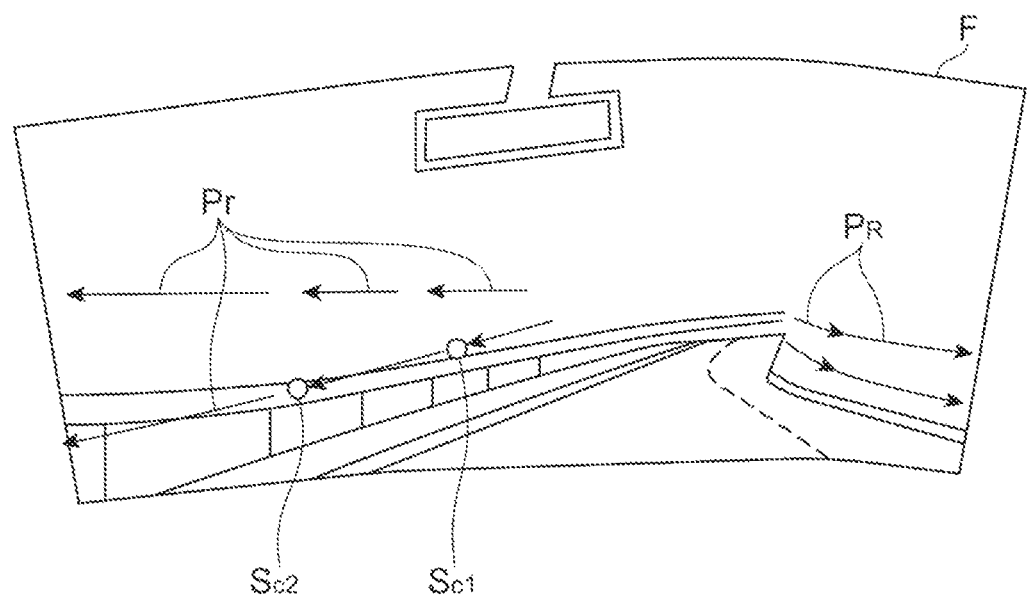
FIG. 13 is a diagram for explaining an optical flow of a landscape in front of the host vehicle.

The optical flow recognition unit 41 recognizes the optical flow of the landscape in front of the host vehicle M based on the image captured by the camera of the external sensor 2 using the well-known image processing. Here, FIG. 13 is a diagram for explaining the optical flow of the landscape in front of the host vehicle M. FIG. 13 illustrates landscape of the host vehicle M through a windshield. FIG. 13 illustrates the front glass F of the host vehicle M, an arrow $P_L$ indicating the optical flow on the left side of the host vehicle M, an arrow $P_R$ indicating the optical flow on the right side of the host vehicle M, a driver's line of sight position Sc1 at a certain time point T1, a driver's line of sight position Sc2 at a time point T2 after the time point T1. A difference between the time point T1 and the time point T2 is, for example, 0.1 second.

As illustrated in FIG. 13, since the landscape in front of the host vehicle M flows to the back due to the traveling of the host vehicle M, the optical flow recognition unit 41 recognizes optical flows such as the arrow $P_L$ and the arrow $P_R$.

The driving readiness degree estimation unit 42 corrects the driving readiness degree based on the optical flow recognized by the optical flow recognition unit 41 and the driver's line of sight recognized by the driver's line of sight recognition unit 15. If the direction of the optical flow and the moving direction of the driver's line of sight (direction of the change of position) coincide with each other as illustrated in FIG. 13, since it is considered that the driver's line of sight having a low driving consciousness may be dragged into the flow of landscape, the driving readiness degree estimation unit 42 corrects the driving readiness degree to a small value.

The coincidence between the direction of the optical flow and the moving direction of the driver's line of sight does not need to be a complete coincidence. If the moving direction of the driver's line of sight is included in a range of a certain angle from the direction of the optical flow, it may be determined that the direction of the optical flow and the moving direction of the driver's line of sight coincide with each other. The range of a certain angle is, for example, a range of 3 degrees upward and 3 degrees downward on the driver's field of view G or the windshield F.

For example, if a length of time in which the direction of the optical flow and the moving direction of the driver's line of sight coincide with each other is equal to or longer than a length of coincidence time threshold value (for example, 1 second), the driving readiness degree estimation unit 42 corrects the driving readiness degree according to the length of time. The driving readiness degree estimation unit 42 may correct the driving readiness degree according to following Equation (5). The length of coincidence time is the length of time in which the direction of the optical flow and the moving direction of the driver's line of sight coincide with each other.

Equation (5)

$$\text{corrected driving readiness degrees} = \text{driving readiness degrees} \times \frac{1}{(\text{length of coincidence time})} \quad (5)$$

Driving Consciousness Estimation Processing in Fourth Embodiment

Figure 14:
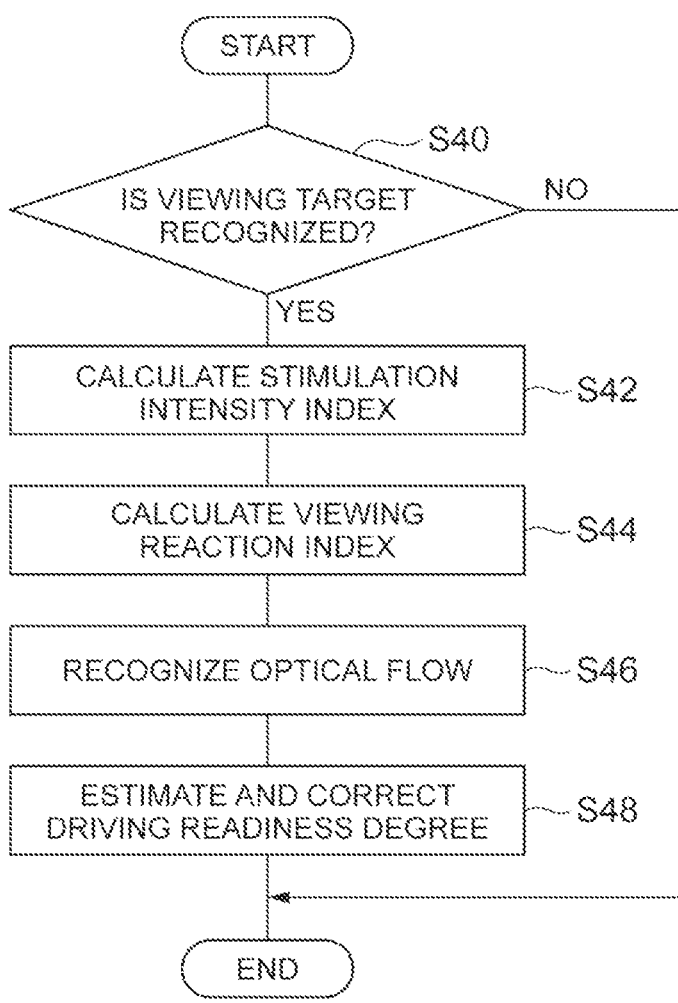
FIG. 14 is a flowchart illustrating driving readiness degree estimation processing by the driving consciousness estimation device in the fourth embodiment.

Next, the driving consciousness estimation processing by the driving consciousness estimation device 400 in the fourth embodiment will be described with reference to FIG. 14. FIG. 14 is a flowchart illustrating the driving readiness degree estimation processing by the driving consciousness estimation device 400 in the fourth embodiment. The processing in the flowchart illustrated in FIG. 14 can be started under the condition the same as the flowchart in the first embodiment illustrated in FIG. 6. Since S40 to S44 in FIG. 14 are the same as S10 to S14 in FIG. 6, the description thereof will be simplified.

As illustrated in FIG. 14, the ECU 40 of the driving consciousness estimation device 400 determines whether or not a viewing target is recognized by the viewing target recognition unit 14 as S40. If it is determined that the viewing target is not recognized (No in S40), the ECU 40 ends the current processing. Thereafter, if an ending condition set in advance is not satisfied, the ECU 40 repeats the determination from S40 again after a certain time. If it is determined that the viewing target is recognized (YES in S40), the ECU 40 moves the processing to S42.

In S42, the ECU 40 calculates the stimulation intensity index of the viewing target using the stimulation intensity index calculation unit 16. In S44, the ECU 40 calculates the driver's viewing reaction index of the viewing target using the viewing reaction index calculation unit 17.

In S46, the ECU 40 recognizes the optical flow of the landscape in front of the host vehicle M using the optical flow recognition unit 41. The optical flow recognition unit 41 recognizes the optical flow of the landscape in front of the host vehicle M based on the image captured by the camera of the external sensor 2 using the well-known image processing.

In S48, the ECU 40 estimates and corrects the driving readiness degree using the driving readiness degree estimation unit 42. The driving readiness degree estimation unit 42 estimates the driving readiness degree in the same way used by the driving readiness degree estimation unit 18 in the first embodiment. The driving readiness degree estimation unit 42 corrects the driving readiness degree based on the optical flow recognized by the optical flow recognition unit 41 and the driver's line of sight recognized by the driver's line of sight recognition unit 15. For example, if the length of time in which the direction of the optical flow and the moving direction of the driver's line of sight coincide with each other is equal to or longer than the length of coincidence time threshold value (for example, 1 second), the driving readiness degree estimation unit 42 corrects the driving readiness degree to a small value using Equation (5) described above.

Operational Effects of Driving Consciousness Estimation Device in Fourth Embodiment According to the driving consciousness estimation device 400 in the fourth embodiment described above, since the line of sight of the driver having a low driving consciousness tends to be dragged into the direction of the optical flow which is the flowing direction of the landscape, the driving readiness degree is corrected based on the optical flow and the driver's line of sight. Therefore, it is possible to appropriately estimate the driving readiness degree.

The preferred embodiments of the present disclosure are described above, however, the present disclosure is not limited to the above-described embodiments. The present disclosure can be implemented in various forms including various modifications and improvements based on the knowledge of those skilled in the art, including the above-described embodiments.

For example, any two embodiments of the driving consciousness estimation device 200 in the second embodiment, the driving consciousness estimation device 300 in the third embodiment, and the driving consciousness estimation device 400 in the fourth embodiment may be combined to be adopted, or all three embodiments may be combined to be adopted.

The driving consciousness estimation devices 100 to 400 do not necessarily need to be connected to the autonomous drive ECU 7, and do not need to configure a part of the autonomous driving system. In addition, the driving consciousness estimation devices 100 to 400 do not necessarily need to include the stimulation intensity index calculation unit 16. The driving consciousness estimation devices 100 to 400 may estimate the driving readiness degree using the viewing reaction index calculated by the viewing reaction index calculation unit 17. The driving consciousness estimation devices 100 to 400 can estimate the driving readiness degree using arithmetic equations or table data set in advance based on, for example, the viewing reaction index. The driving consciousness estimation devices 100 to 400 may adopt the value of the viewing reaction index as the driving readiness degree.

If the viewing target is an interruption vehicle, the stimulation intensity index calculation unit 16 may calculate the stimulation intensity index of the interruption vehicle based on a brightness contrast of the blinker lamp of the interruption vehicle in addition to the viewing area of the interruption vehicle and the lateral moving speed of the interruption vehicle Np in the driver's field of view G. The stimulation intensity index calculation unit 16 may calculate the stimulation intensity index of the interruption vehicle using only one of the viewing area of the interruption vehicle and the lateral moving speed of the interruption vehicle Np in the driver's field of view G.

If the viewing target is an overtaking vehicle, the stimulation intensity index calculation unit 16 may calculate the stimulation intensity index of the overtaking vehicle based on only one of the relative speed of the host vehicle M and the overtaking vehicle and the size of the overtaking vehicle. If the viewing target is a braking preceding vehicle, the stimulation intensity index calculation unit 16 may calculate the stimulation intensity index of the preceding vehicle based on only one of the vehicle-to-vehicle distance and the relative speed between the host vehicle M and the preceding vehicle. If the viewing target is a preceding vehicle causing the host vehicle in autonomous driving to change the speed, the stimulation intensity index calculation unit 16 may calculate the stimulation intensity index of the preceding vehicle based on only the viewing area of the preceding vehicle. The preceding vehicle causing the host vehicle in autonomous driving to change the speed may include a preceding vehicle causing the host vehicle under a driving support control such as ACC to change the speed. If the viewing target is a curve, the stimulation intensity index calculation unit 16 may calculate the stimulation intensity index of the curve based on only the curvature radius of the curve.

If the viewing target is a curve, the viewing reaction index calculation unit 17 may calculate the viewing reaction index based on a driver's movement frequency of the eyeball and a driver's movement distance of the eyeball. The driver's movement frequency of the eyeball is the number of times the driver's eyeball moved within a certain time (for example, within 1 second). A well-known definition can be used for the driver's movement frequency and the movement distance of the eyeball.

The viewing reaction index calculation unit 17 can obtain the driver's movement frequency of the eyeball and the driver's movement distance of the eyeball based on the driver's image recognized by the driver's image acquisition unit 11 using a well-known method relating to the eyeball movement (saccade). While the host vehicle is traveling on a curve, every time the host vehicle advances, the driver having a high driving consciousness frequently moves the eyeball at short distances so as to view further ahead of the curve. On the other hand, the eyeball of the driver having a low driving consciousness follows the flowing landscape or keeps to see one point and the eyeball movement remains in a narrow range. Therefore, the number of movements decreases and the movement distance increases. The viewing reaction index calculation unit 17 can calculate the driver's viewing reaction index for the curve using, for example, following Equation (6).

Equation (6)

$$\text{viewing reaction index} = B \times \frac{\text{driver's movement frequency of the eyeball}}{\text{driver's movement distance of the eyeball}} + A \quad (6)$$

The viewing reaction index calculation unit 17 may calculate the viewing reaction index based on a probability that the driver views the viewing target for a plurality of same type viewing targets. The probability that the driver views the viewing target can be obtained, for example, by dividing the number of times the driver viewed a certain type of viewing target within a certain time from the current time point by the number of appearances of that type of viewing target. Specifically, if the interruption vehicle appears multiple times within a certain time, the viewing reaction index calculation unit 17 may obtain the probability that the driver viewed the interruption vehicle from the number of times the driver viewed each interruption vehicle (counted only once for one interruption vehicle). The viewing reaction index calculation unit 17 calculates the viewing reaction index within the certain time based on the probability that the driver viewed the interruption vehicle. The probability that the driver viewed the viewing target for all kinds of viewing targets can be used for calculating the viewing reaction index.

In the driving consciousness estimation device 100, a preceding vehicle with a blinker turned on may be included in the viewing target. If the blinker of the preceding vehicle is turned on, the driver having a high driving consciousness can be considered to view the preceding vehicle. The viewing target recognition unit 14 can recognize the preceding vehicle with the blinker turned on based on, for example, the image captured by the camera of the external sensor 2. if the preceding vehicle with the blinker turned on is the viewing target, the stimulation intensity index calculation unit 16 calculates stimulation intensity index of the preceding vehicle based on the relative situation (for example, the vehicle-to-vehicle distance) between the host vehicle and the preceding vehicle, and the brightness contrast of the blinker of the preceding vehicle. The viewing reaction index calculation unit 17 calculates the viewing reaction index based on the reaction time from the time when the viewing target recognition unit 14 recognizes the preceding vehicle with the blinker turned on as the viewing target up to the time when the driver views the viewing target. The driving readiness degree estimation unit 18 estimates the driver's driving readiness degree corresponding to the preceding vehicle with the blinker turned on, based on the stimulation intensity index of the viewing target calculated by the stimulation intensity index calculation unit 16 and the driver's viewing reaction index of the viewing target calculated by the viewing reaction index calculation unit 17.

The driving consciousness estimation device 100 may include mirrors (a rear view mirror, side mirrors, and the like) of the host vehicle M as the viewing targets. It can be considered that the driver having high driving consciousness frequently checks the mirrors of the host vehicles. If it is determined that a following vehicle is present based on the traveling environment recognized by the traveling environment recognition unit 12, the stimulation intensity index calculation unit 16 sets the stimulation intensity index of the rear view mirror to a larger value compared to a case where it is determined that a following vehicle is not present. If it is determined that a following vehicle is present on the adjacent lane, the stimulation intensity index calculation unit 16 sets the stimulation intensity index of the side mirror on the adjacent lane side to a large value compared to a case where it is determined that a following vehicle is not present on the adjacent lane. The driving consciousness estimation device 100 does not necessarily need to calculate the stimulation intensity index of the mirror.

The viewing reaction index calculation unit 17 calculates the viewing reaction index of the mirrors based on the frequency of viewing the mirrors by the driver. The viewing reaction index calculation unit 17 can obtain the driver's frequency of viewing the mirrors based on the driver's line of sight recognized by the driver's line of sight recognition unit 15. The driving readiness degree estimation unit 18 estimates the driving readiness degree based on the stimulation intensity index of the mirrors and the driver's viewing reaction index for the mirror.

What is claimed is:
1. A driving consciousness estimation device that is configured to estimate a driver's driving consciousness of a host vehicle as a driving readiness degree, comprising:
an electronic control unit (ECU), including at least one processor, programmed to:

recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
calculate a stimulation intensity index of the viewing target,
wherein, if another vehicle is recognized as the viewing target, calculate the stimulation intensity index of the other vehicle based on at least one of a viewing area of the other vehicle and a relative situation between the host vehicle and the other vehicle, and
estimate the driving readiness degree based on the stimulation intensity index and the driver's viewing reaction index.

2. A driving consciousness estimation device that is configured to estimate a driver's driving consciousness of a host vehicle as a driving readiness degree, comprising:
an electronic control unit (ECU), including at least one processor, programmed to:
recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
calculate a stimulation intensity index of the viewing target,
wherein, if a road shape is recognized as the viewing target, calculate the stimulation intensity index of the road shape based on at least one of a curvature radius of the road shape and a number of traveling vehicles in the road shape, and
estimate the driving readiness degree based on the stimulation intensity index and the driver's viewing reaction index.

3. A driving consciousness estimation device that is configured to estimate a drivers driving consciousness of a host vehicle as a driving readiness degree, comprising:
an electronic control unit (ECU), including at least one processor, programmed to:
recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
calculate a stimulation intensity index of the viewing target,
wherein, if an object on a road is recognized as the viewing target, and estimate the driving readiness degree based on the stimulation intensity index and the driver's viewing reaction index.

4. A driving consciousness estimation device that is configured to estimate a driver's driving consciousness of a host vehicle as a driving readiness degree, comprising:
an electronic control unit (ECU), including at least one processor, programmed to:
recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
recognize a movement range of the driver's line of sight based on the driver's line of sight, and
correct the driving readiness degree based on the movement range.

5. A driving consciousness estimation device that is configured to estimate a driver's driving consciousness of a host vehicle as a driving readiness degree, comprising:
an electronic control unit (ECU), including at least one processor, programmed to:
recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
recognize an optical flow of a landscape in front of the host vehicle based on an image captured by a camera of the host vehicle, and
correct the driving readiness degree based on the optical flow and the driver's line of sight.

6. A driving consciousness estimation device that is configured to estimate a drivers driving consciousness of a host vehicle as a driving readiness degree, comprising:
an electronic control unit (ECU), including at least one processor, programmed to:
recognize a viewing target used for estimating the driving readiness degree based on a result of detection by an external sensor of the host vehicle;
recognize a driver's line of sight;
calculate a driver's viewing reaction index for the viewing target based on the driver's line of sight;
estimate the driving readiness degree based on the driver's viewing reaction index;
perform estimations of the driving readiness degrees multiple times for each viewing target,
perform weighting of the driving readiness degrees according to the viewing target, and
calculate an integrated driving readiness degree based on the driving readiness degrees multiple times estimated within a time set in advance and the result of weighting.

* * * * *